United States Patent [19]

Hale et al.

[11] Patent Number: 6,151,638

[45] Date of Patent: *Nov. 21, 2000

[54] SYSTEM AND METHOD FOR PERFORMING EXTERNAL PROCEDURE CALLS FROM A CLIENT PROGRAM TO A SERVER PROGRAM TO A SERVER PROGRAM AND BACK TO THE CLIENT PROGRAM WHILE BOTH ARE RUNNING IN A HETEROGENOUS COMPUTER

[75] Inventors: J. Calvin Hale, Rancho Santa Margarita; Mark Joseph Rentmeesters, Irvine; Norman Roy Smith, Lake Forest, all of Calif.

[73] Assignee: Unisys Corp., Blue Bell, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/882,643

[22] Filed: Jun. 25, 1997

[51] Int. Cl.[7] ........................................................ G06F 9/46
[52] U.S. Cl. ................................................................ 709/312
[58] Field of Search .................................. 364/131, 134; 709/106, 310, 315, 330, 312; 395/676, 680, 683, 684

[56] References Cited

U.S. PATENT DOCUMENTS

| | | | |
|---|---|---|---|
| 4,297,743 | 10/1981 | Appell et al. | 364/200 |
| 4,722,048 | 1/1988 | Hirsch et al. | 364/200 |
| 4,862,354 | 8/1989 | Fiacconi et al. | 364/200 |
| 5,027,271 | 6/1991 | Curley et al. | 364/200 |
| 5,230,065 | 7/1993 | Curley et al. | 395/200 |
| 5,247,676 | 9/1993 | Ozur et al. | 395/650 |
| 5,339,422 | 8/1994 | Brender et al. | 395/700 |
| 5,511,197 | 4/1996 | Hill et al. | 395/700 |
| 5,619,685 | 4/1997 | Schiavone | 395/500 |
| 5,619,710 | 4/1997 | Travis, Jr. et al. | 395/800 |

OTHER PUBLICATIONS

Aho, "Compilers Principles, Techniques, and Tools," Bell Telephone Laboratories, Incorporated, pp. 404–427 and 522–529, Mar. 1988.

*Primary Examiner*—Alvin E. Oberley
*Assistant Examiner*—Gary S. Fourson
*Attorney, Agent, or Firm*—J. Ronald Richebourg; Mark T. Starr; Stevens B. Samuels

[57] ABSTRACT

There is provided a method in a heterogeneous computer system having at least two CPU's accessing a common memory, which memory has stored therein at least two distinct operating systems. Client and Server Programs are also stored in the common memory. The Client Program is adapted for making function calls to the Server Program and the Server Program is adapted for returning results of the called function to the Client Program. Moreover, the Server Program is adapted for making function calls back to the Client Program and for receiving results therefrom. The Client Program includes procedures for invoking a Server Program function, for converting parameters and result data from a format compatible with the first operating system to one compatible with the second operating system and for passing data between the Client CPU and the Server CPU. The Server Program includes Procedures for invoking a Client Program function and for converting parameters and result data from a format compatible with the second operating system to one compatible with the first operating system.

22 Claims, 37 Drawing Sheets

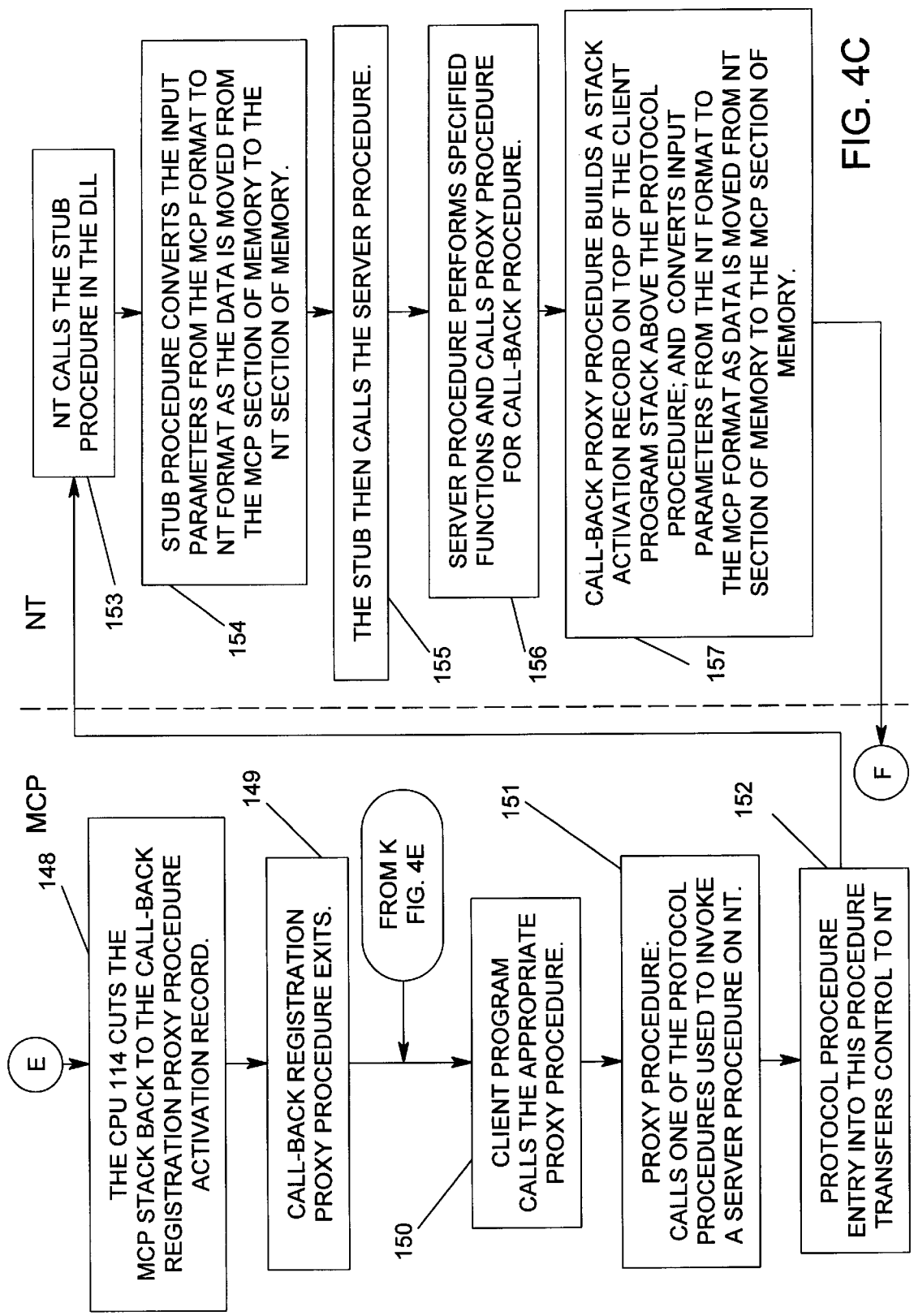

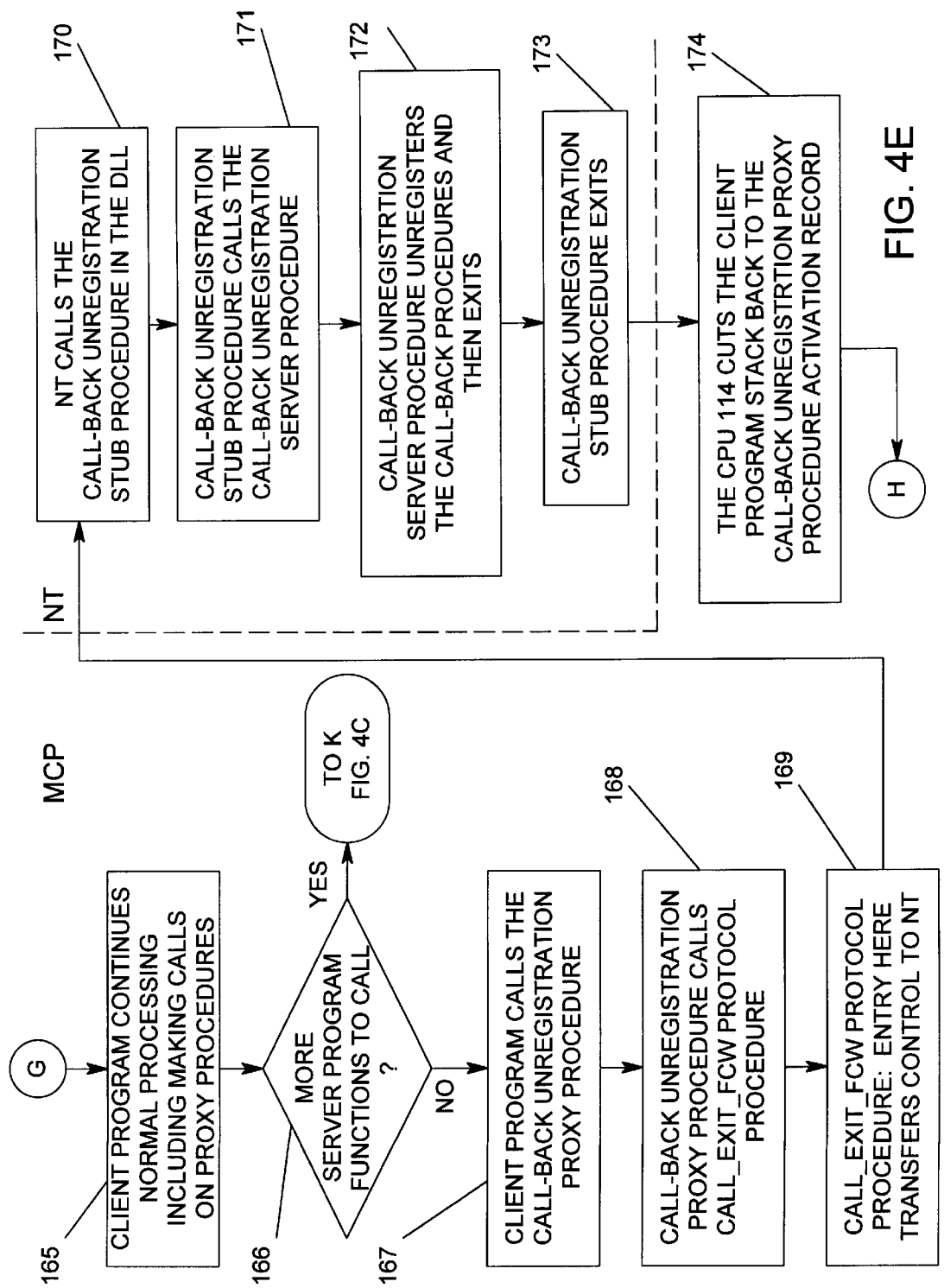

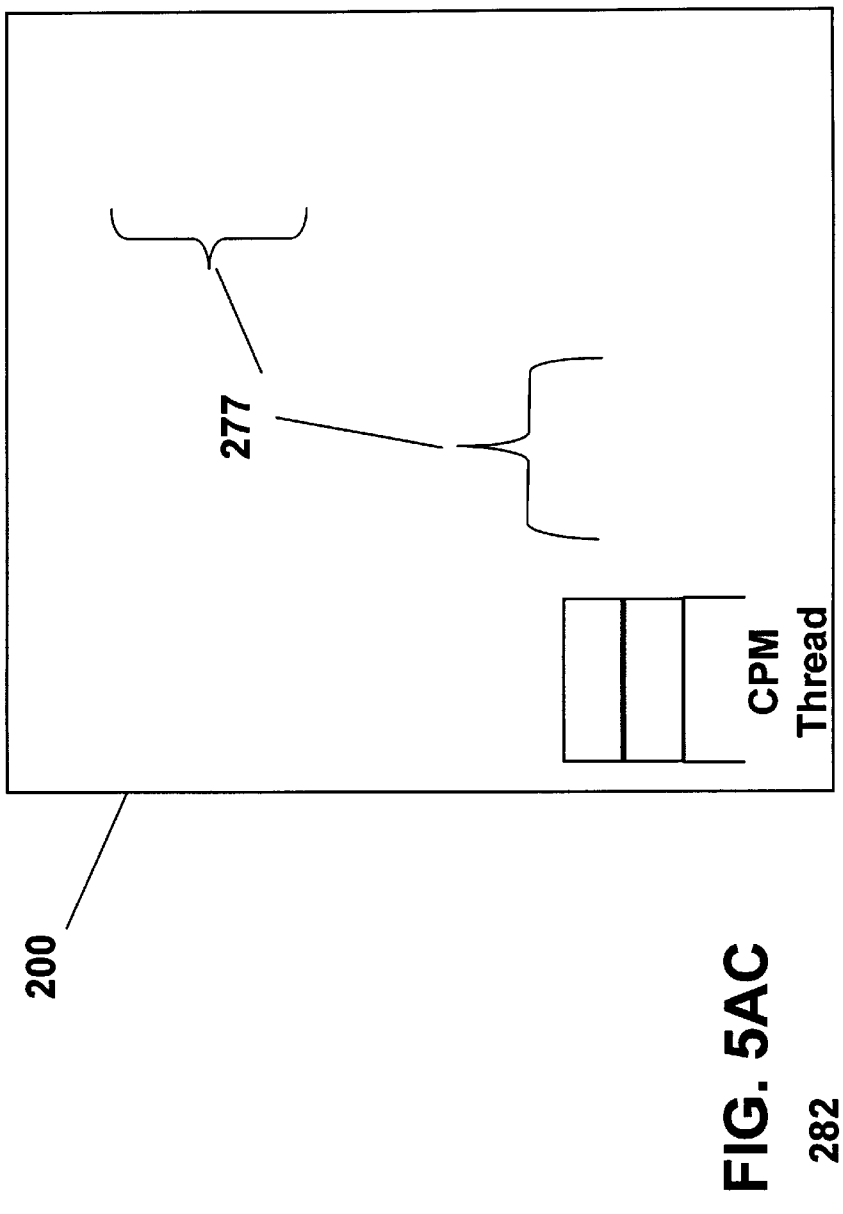
FIG. 5AC
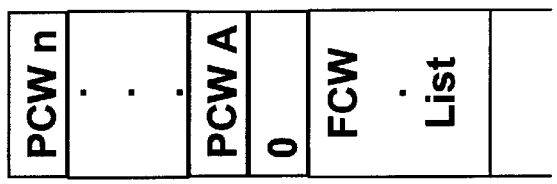

SYSTEM AND METHOD FOR PERFORMING EXTERNAL PROCEDURE CALLS FROM A CLIENT PROGRAM TO A SERVER PROGRAM TO A SERVER PROGRAM AND BACK TO THE CLIENT PROGRAM WHILE BOTH ARE RUNNING IN A HETEROGENOUS COMPUTER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS REFERENCE TO RELATED APPLICATIONS

This application relates to the following copending applications, assigned to the same assignee hereof, which are incorporated herein by reference.

U.S. Ser. No. 08/882,639, entitled A NEW AND IMPROVED SYSTEM AND METHOD FOR PERFORMING EXTERNAL PROCEDURE CALLS IN A HETEROGENEOUS COMPUTER;

U.S. Ser. No. 08/882,641, entitled A SYSTEM AND METHOD FOR PERFORMING EXTERNAL PROCEDURE CALLS FROM A CLIENT PROGRAM TO A SERVER PROGRAM WHILE BOTH ARE RUNNING IN A HETEROGENEOUS COMPUTER;

U.S. Ser. No. 08/882,641, entitled A SYSTEM AND METHOD FOR PERFORMING EXTERNAL PROCEDURE CALLS FROM A SERVER PROGRAM TO A CLIENT PROGRAM WHILE BOTH ARE RUNNING IN A HETEROGENEOUS COMPUTER;

FIELD OF THE INVENTION

The present invention generally relates to external procedure calls in a computer system executing a program, and in particular to a method for performing external procedure calls from a server program to a client program, wherein the server program is executing a call from the client program and both are running in a heterogeneous computer system sharing a common memory. The term "External Procedure Calls" (or "EPC") is used herein to refer to the making of a function call from one operating environment to another of a heterogeneous computer system. The term "heterogeneous multiprocessing system" refers to a single computer system having two or more Central Processing Units (CPUs) that operate with a shared memory and utilize two or more different operating systems.

BACKGROUND OF THE INVENTION

In general computer programs include a number of internal functions, plus computer codes that call these functions in a specific order. This approach works well when all of the necessary functions are available within a single program. However, there are times when a required function is located elsewhere. Such functions are normally referred to as remote, or external functions.

One way to make these remote or external functions available to a program is to incorporate them into the local program. When feasible, this is the most efficient approach. However, remote or external functions sometimes depend upon other things (e.g., data, operating systems, hardware, etc.), which may not be available to the local program. In such situations, importing the remote or external function to the local program is not possible. Hence, the only alternative is to invoke the desired function remotely. These are known as Remote Procedure Calls (RPC's), which are available for such use. RPC's operate much, much slower than internal functions, in fact they are four or more orders of magnitude slower.

Some systems provide a streamlined RPC mechanism for use in shared memory environments, which are referred to as Local Procedure Calls (LPC). This capability eliminates the overhead of moving a function call across a network and reduces the per call overhead to less than 1 microsecond with today's microprocessors. Local Procedure Calls, however, are only available when all of the functions are running under the control of one single operating system.

In a heterogeneous multiprocessing (HMP) system, there is a desire to have two different operating systems closely cooperating to carry out certain tasks. The term "heterogeneous multiprocessing system" refers to such systems, and in particular for purposes of this disclosure shall mean a single computer system comprised of two or more Central Processing Units (CPUs), all operating with a shared memory, and utilizing two or more different operating systems.

Technologies are available for carrying out this cooperation, which are variants of Remote Procedure Calls (RPCs). RPCs operate over a network transport of some sort, and serve to physically move a request from one environment to another. At best, they operate in the range of 100 microseconds overhead per call. While this overhead is acceptable for some long operations, it is excessive for short operations, making cooperation impractical. In addition, the 100 microsecond or greater overhead must be incurred by each function call, further reducing the desirability of RPCs. A function calling sequence with drastically reduced overhead is required.

In shared memory HMP environments, there is no need to physically move the function from the memory of one operating environment to the memory of the other. Both operating environments share a single memory. An External Procedure Call (EPC) is the making of a function call from one operating environment to another in an HMP system. EPC's take advantage of the shared memory in an HMP system to expedite the calling sequence between operating environments, allowing overheads of less than 1 microsecond using today's Instruction Processors or as referred to herein Central Processing Units (CPU's). This overhead reduction allows EPCs to be used for cooperative processing where RPCs would be impractical. Examples of potential uses for EPCs include: direct use of DMSII verbs from NT applications and direct use of NT security and encryption algorithms from MCP environments.

SUMMARY OF THE INVENTION

In accordance with the above and other objects, features and advantages of the method of the present invention, there is provided a method in a heterogeneous computer system including at least two CPU's and a common memory disposed for access by both CPU's and disposed for storing at least two operating systems that control operation of the system. A Client and a Server Program are both stored in the same common memory. The Client Program is adapted for making function calls to the Server Program and the Server Program is adapted for a returning results of the called function to the Client Program. Moreover, the Server Program is adapted for making function calls back to the Client Program and for receiving results therefrom.

The Client Program includes Proxy Procedures for invoking Server Program functions, Stub Procedures representing each Client Program function called by the Server Program, and Protocol Procedures for use by the Proxy Procedures and the Stub Procedures for passing data between the Client CPU and the Server CPU. The Server Program includes Proxy Procedures for invoking Client Program functions, and Stub Procedures representing each Server Program function called by the Client Program.

By use of the method of the present invention, modern computers can execute in excess of 1,000,000 External Procedure Calls per second, using the ClearPath HMP systems. These speeds are well within one order of magnitude of local function calls, and are a full three orders of magnitude faster than the prior art Remote Procedure Calls. This speed allows programmers to use remote or external functions for many more purposes than were possible using standard Remote Procedure Calls.

Still other objects, features and advantages of the present invention will become readily apparent to those skilled in the art from the following detailed description, wherein there is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS:

FIGS. 4A through 4G combined form a block diagram illustrating the steps of the process of the present invention.

Figure 1:
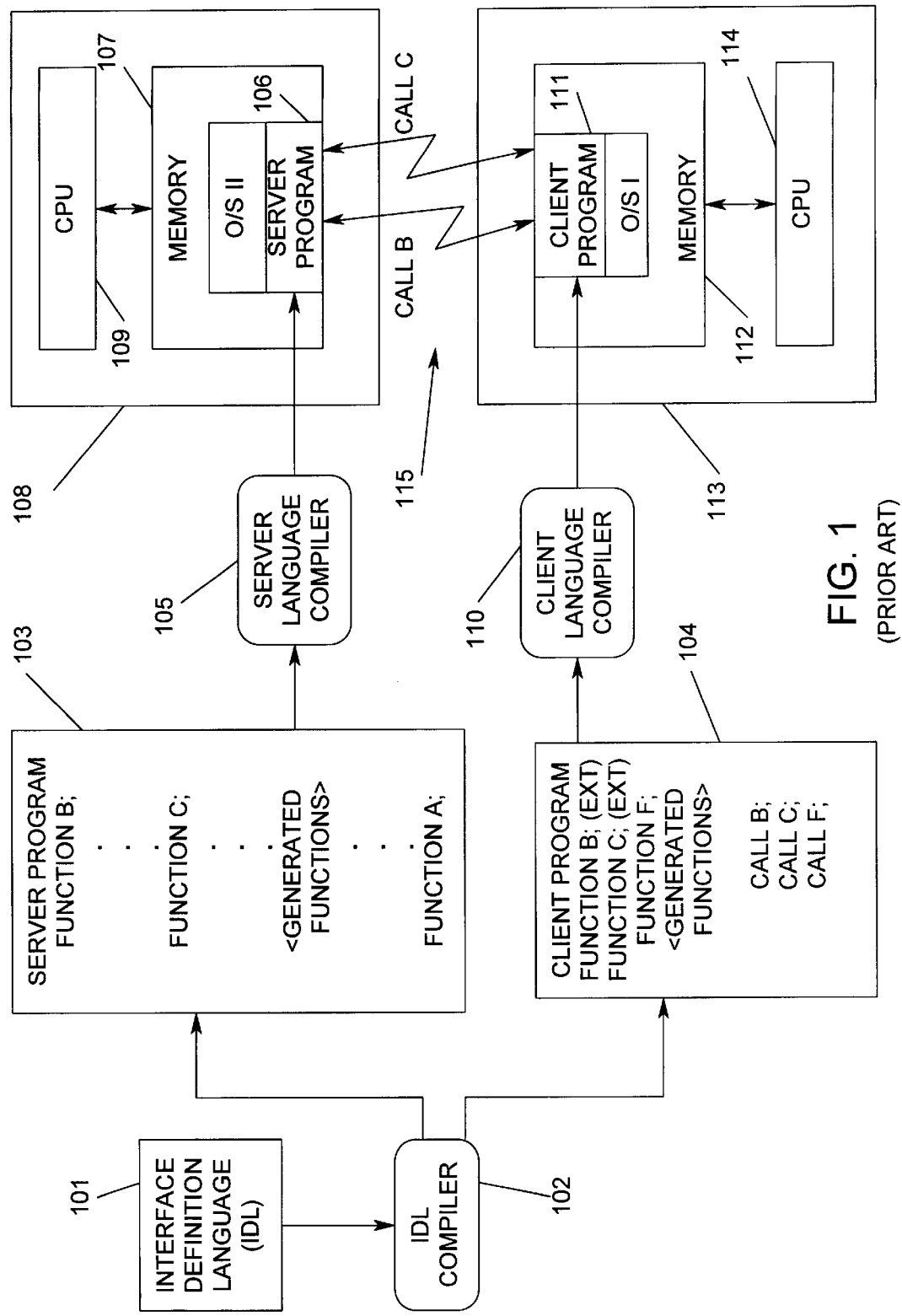
FIG. 1 is a block diagram of the software modules of the prior art remote procedure call schema.

DETAILED DESCRIPTION OF A PREFERRED EMBODIMENT:

Referring now to FIG. 1, a block diagram of the software modules making up the prior art remote procedure call schema is shown. Remote or external functions are first identified through an Interface Definition Language (IDL block 101). This input is processed by an IDL compiler 102 to produce two program skeletons for exemplary functions B and C: i.e., a Server Program skeleton 103 and a Client Program skeleton 104. The Server Program 103 skeleton contains declarations for the remote or external functions (Functions B and C in this example), plus some generated functions to allow the remote or external functions to be accessed remotely. A computer programmer adds computer codes to the Server Program in a conventional well-known manner to provide the actual workings of each remote or external function (e.g., Functions B and C). The computer programmer may also add additional functions that are not remotely or externally callable (e.g., Function A). The resulting program is then compiled with a server language compiler 105 to produce an executable Server Program 106 stored in a memory 107 of a computer 108 having a CPU 109 coupled thereto. An Operating System (O/S II) is also stored in the memory 107 and controls operation of the CPU 109, the memory 107 and the Server Program 106.

The Client Program skeleton 104 contains declarations for the remote or external functions as well, with indications that they are remote or external (again, Functions B and C). The Client Program skeleton 104 also contains generated functions to allow the remote or external functions to be accessed remotely. A computer programmer adds codes to the Client Program skeleton 104 to provide the actual workings of the program itself, including calls to the remote or external functions (for example, statements CALL B and CALL C) . The computer programmer may also add additional functions that are accessed locally (e.g., Function F). The resulting program is then compiled with a client language compiler 110 to produce an executable Client Program 111 stored in a memory 112 of a computer 113 having a CPU 114 coupled thereto. Another Operating System (O/S I) is also stored in the memory 112 and controls operation of the CPU 114, the memory 112 and the Client Program 111.

At this stage, the programs are ready for execution. The Client Program 111 is started on the computer 113 under the control of the O/S I. The Server Program 106 is started on the computer 108 under the control of the O/S II. The mechanisms for starting each program are specific to the computers on which they run, and are well known in the art. It is pointed out that each computer could be using entirely different operating systems, comprising entirely different hardware, utilizing entirely different CPUs and instruction sets, and having access to entirely different hardware and software resources.

When the Client Program 111 calls one of the remote or external functions (e.g., CALL B), the generated functions intercept the CALLS and transport them to the computer 108, via a network 115, where the Server Program 106 is running. Then, using the generated functions of the Server Program 106, the remote or external function is invoked therein. When the invoked function is finished, any results are returned to the Client Program 111 in a like manner. The generated functions communicate over the network 115 between the two computers; and, perform any data translations and network protocols necessary to transport call requests, parameters and responses from one computer to the other.

There is a problem with the previously described solution. When a function is called locally within a program, the overhead necessary to make the function call is several CPU instructions in length. Today's CPUs can execute tens of millions of function calls per second. When a function is remote or external, the generated functions have much work to do, which becomes an integral part of the function invocation. This overhead takes thousands of CPU instructions, plus transmission delays. The result is that today's computers can execute on the order of 50 to 1,000 remote or external function calls per second. Thus, remote or external function calls operate around four orders of magnitude slower than local function calls. This makes remote or external function calls impractical for many applications.

Figure 2:
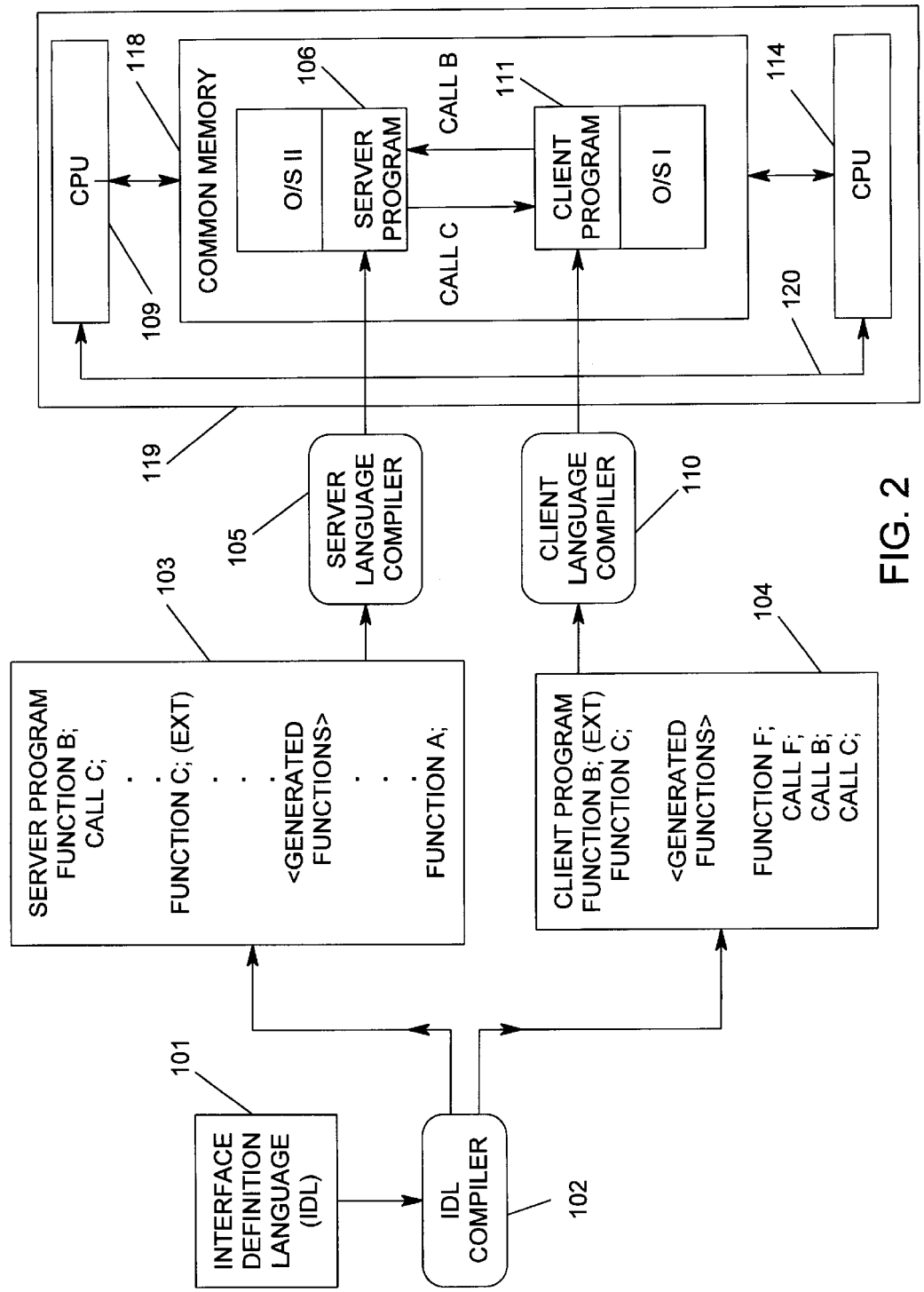
FIG. 2 is a block diagram that illustrates the software modules depicting the sequence of steps necessary to develop programs that could make use of the method of the present invention.

Referring now to FIG. 2, a block diagram illustrates the sequence of steps necessary to develop programs that could make use of the method of the present invention. External Procedure Calls begin with the same basic approach as Remote Procedure Calls. The same Interface Definition Language 101 is used, and the same IDL compiler 102 generates a Server Program skeleton 103, and a Client Program skeleton 104. There are differences however in the generated functions, but these differences are transparent to the computer programmer. The computer programmer performs the identical steps of completing each program, and compiling it using the same appropriate language compiler 105 or 110. The resulting programs 106 and 111, respectively, are then run on a special computer system 119 having two operating systems (e.g., O/S I and O/S II) controlling two CPU's (e.g., CPU 114 and CPU 109, respectively) connected in a very closely coupled way by means of a bus 120. A suitable example of such a system is the ClearPath HMP Systems manufactured and sold by Unisys Corporation, assignee of this patent. The only special requirements for such a computer system are that it must incorporate a shared memory 118 between the two Operating Systems, and there must be a high-speed CPU-to-CPU signaling bus available, such as the bus 120.

When the Client Program 111 calls a remote or external function using the method disclosed herein, i.e. External Procedure Calls, the generated functions operate to invoke the appropriate Server function at very nearly the same speed as if the function was a local one. This is accomplished while still allowing the Operating Systems involved to be different, allowing entirely different hardware, utilizing entirely different CPUs and instruction sets, and having access to entirely different hardware and software resources. Only the two special requirements of a common memory and the high-speed CPU-to-CPU signaling bus 120 need be satisfied.

In one embodiment of the present invention, the Client Program 111 under control of the O/S I makes a call on the Server Program 106 running under control of the O/S II. The O/S II implementation will make use of the Microsoft Interface Definition Language, with extensions, to define the protocol between the Client and Server programs. This IDL will be compiled by an EIDL (E-Mode Interface Definition Language) compiler, which parses the IDL input file and generates the following:

Proxy Procedures: Specific examples of the Generated Functions referenced in both the Server and Client Program skeletons 103 and 104, respectively. These are procedures that the Client and Server Program call when they wish to invoke a function in the other program. Proxy Procedures have the same parameters and procedure types as the procedures defined in the IDL specification. The Proxy Procedure calls an appropriate Protocol Procedure, which is responsible for notifying the other Operating System (i.e., O/S II) that a function in the other program is to be called. There is only one Proxy Procedure for each remote or external function. Hence; for Server Program function B there is exactly one corresponding Proxy Procedure B. The Client Program knows which Proxy Procedure to call in the same way any program knows which functions to call in which order since the programmer wrote the program as such. Moreover, when the programmer creates an IDL specification and declares function B in the IDL, he is required to describe whether function B returns any results (and if so, what type). The generated Proxy Procedure is either one which simply exists or one which returns an appropriate value because the IDL compiler generated it that way.

Stub Procedures: Specific examples of the Generated Functions referenced in both the Server and Client Program skeletons 103 and 104, respectively; and, are procedures that convert the parameters and result data between the O/S I and O/S II formats and call the appropriate Windows NT Server Procedures.

Call-Back Procedures: The term Call-Back Procedure is used to refer to functions in the Client Program which are called by the Server Program. Call-back Procedures are represented by Proxy Procedures in the Server Program, and are provided with Stub Procedures in the Client Program.

Server skeletons: These are depicted as Server Programs in FIGS. 1 and 2 and contain the NT Server Procedure headings and empty bodies, which are shown in FIGS. 1 and 2 as FUNCTION B and FUNCTION C, respectively, inside the Server Program skeleton 103. The application programmer is responsible for providing the logic within the procedure bodies, which is then referred to as a Server Procedure.

In one embodiment of the present invention, one additional type of procedure is provided in the Generated Functions for use by the Proxy and Stub Procedures, which is referred to herein as an FCW Protocol Procedure. These Procedures embody the specific mechanisms used to pass information between the CPU 114 and CPU 109 in the Heterogeneous Multiporcessing System 119, and serve as the mechanism by which an MCP Client Program can notify the Windows NT Operating System that a Server Program function is about to be called. The MCP Client Program is responsible for initiating the connection between the MCP Operating System (O/S I) and the Windows NT programs, which connection is established by calling an Open__FCW__Protocol Procedure. The MCP Operating System is available from Unisys Corporation, assignee of this patent. The Windows NT Operating System is available from Microsoft Corporation of Redmond, Wash., and is sometimes referred to herein for brevity as "NT".

Figure 3:
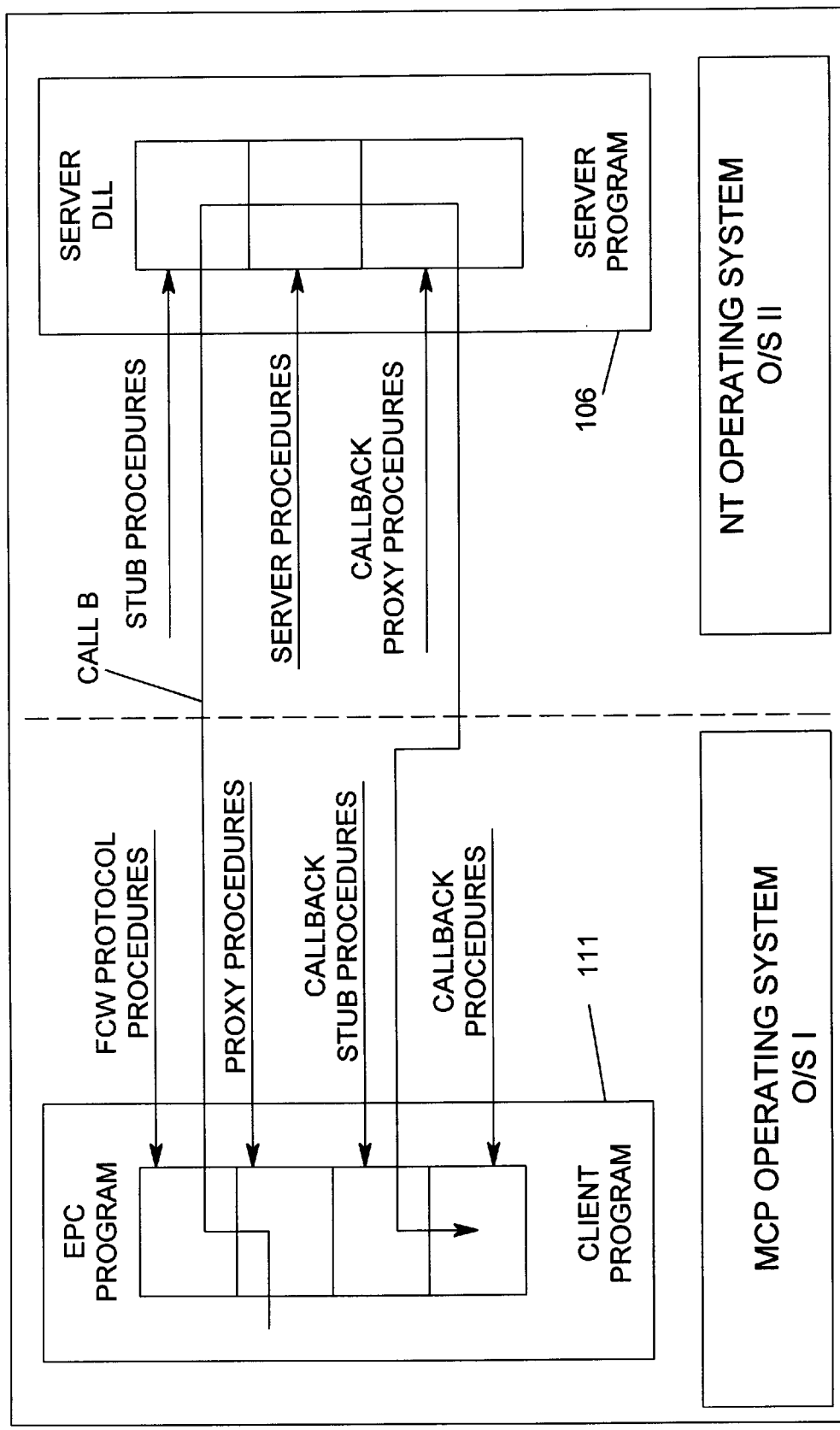
FIG. 3 is another block diagram of the software modules of the schema of the present invention that illustrates the operation of external procedure calls at run-time.

Referring now to FIG. 3, there is illustrated a block diagram of the software modules of the schema of the present invention stored in the memory 118. This diagram represents a run-time composition of the Server Program 106 and the Client Program 111 for external procedure calls, as well as the sequence of operations for procedure calls from the Client Program to the Server Program.

In operation, the Client Program 111 makes a call on the Server Program 106, such as for example, CALL B, by calling the Proxy Procedure for function B. The Proxy Procedure, using an appropriate Protocol Procedure, communicates with the appropriate Server Program 106 Stub Procedure (for example, the Stub Procedure for function B). The Stub Procedure calls the actual function (for example, function B). During the processing of the function, the Server Program 106 makes a Call-Back on the Client Program 111, such as for example, CALL C, by calling the Proxy Procedure for function C. The Proxy Procedure, using an appropriate Protocol Procedure, communicates with the appropriate Client Program 111 Stub Procedure (for example, the Stub Procedure for function C). The Stub Procedure calls the actual function (for example, function C). The Client Program 111 function (for example, function C) executes, and returns any results to the Client Program 111 Stub Procedure. The Stub Procedure then communicates with the Server Program 106 Proxy Procedure to provide any results, and informs the Server Program 106 Proxy Procedure that the Client Program 111 function (for example, function C) is complete. The Server Program 106

Proxy Procedure returns any results to the Server Program 106 function (for example, function B), which continues operation. When complete, the Server Program 106 function (for example, function B) returns any results to the Server Program 106 Stub Procedure. The Server Program 106 Stub Procedure communicates with the Client Program 111 Proxy Procedure to provide any results, and informs the Client Program 111 Proxy Procedure that the Server Program 106 function (for example, function B) is complete. The Client Program 111 Proxy Procedure returns any results to the Client Program 111 itself and continues operation.

Figure 4A:
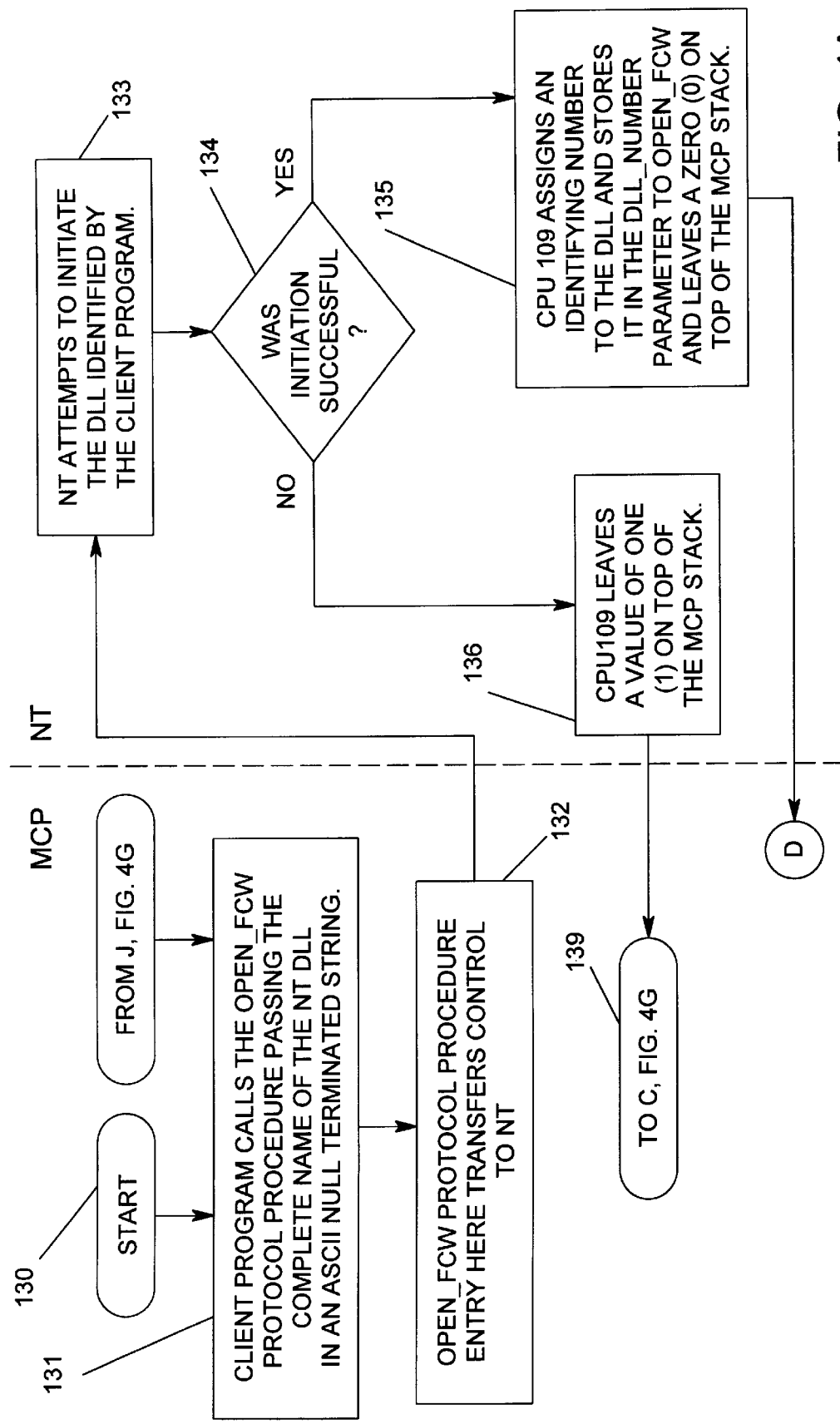

Referring now to FIG. 4A, the first of a seven-part flow chart of the steps of the method of the present invention is shown. A convention used in organizing the various figures is to illustrate the steps performed by the first operating system (i.e., MCP) on the left side of each sheet of the drawings and the steps performed by the second operating system (i.e., Windows NT) on the right side of the sheet, unless otherwise noted. Likewise, referring to FIG. 5A, the first of a 27-part diagram illustrating the steps of the method of the invention is shown. A convention used in organizing FIGS. 5A through 5AC, is to illustrate the steps performed by the first operating system ("MCP") on the left-hand side of each sheet of the drawing (the part of the drawing without the border) and the steps performed by the second operating system ("NT") on the right-hand side of each sheet (the part of the illustration contained within a border 200), unless otherwise noted. The steps shown in FIGS. 4A through 4G and FIGS. 5A through 5AC are two ways to look at the same steps of the method of this invention, and the description which follows applies to both sets of drawings. The method or process begins in the MCP with a start bubble 130 followed by a step performed by the Client Program of calling the Open_FCW Protocol Procedure (block 131). Next, the complete name of the NT Server DLL is passed in an ASCII null terminated string to the Open_FCW Protocol Procedure (block 132). Entry into the Open_FCW Protocol Procedure transfers control to the NT operating system (block 133/233, FIG. 5A). NT then attempts to initiate the DLL identified in the passed parameter (block 133/233, FIG. 5B).

An inquiry is then made as to whether or not the initiation was successful (diamond 134). If the initiation was successful, then the CPU 109 assigns an identifying number to the DLL and stores it in the DLL_Number Parameter to Open_FCW and leaves a zero (0) on top of the MCP stack (block 135/235 FIG. 5B). On the other hand, if the initiation was not successful, the CPU 109 leaves a value of one (1) on top of the MCP stack (block 136). The zero (0) or one (1) will be used as a result by the Client Program to indicate success or failure of the attempt to initiate the NT Server DLL. In response to the step depicted by the block 136 control is returned to MCP where a branch is taken to a connector C in FIG. 4G (bubble 139). The description continues with reference to FIG. 4B as denoted by a connector D.

Figure 4B:
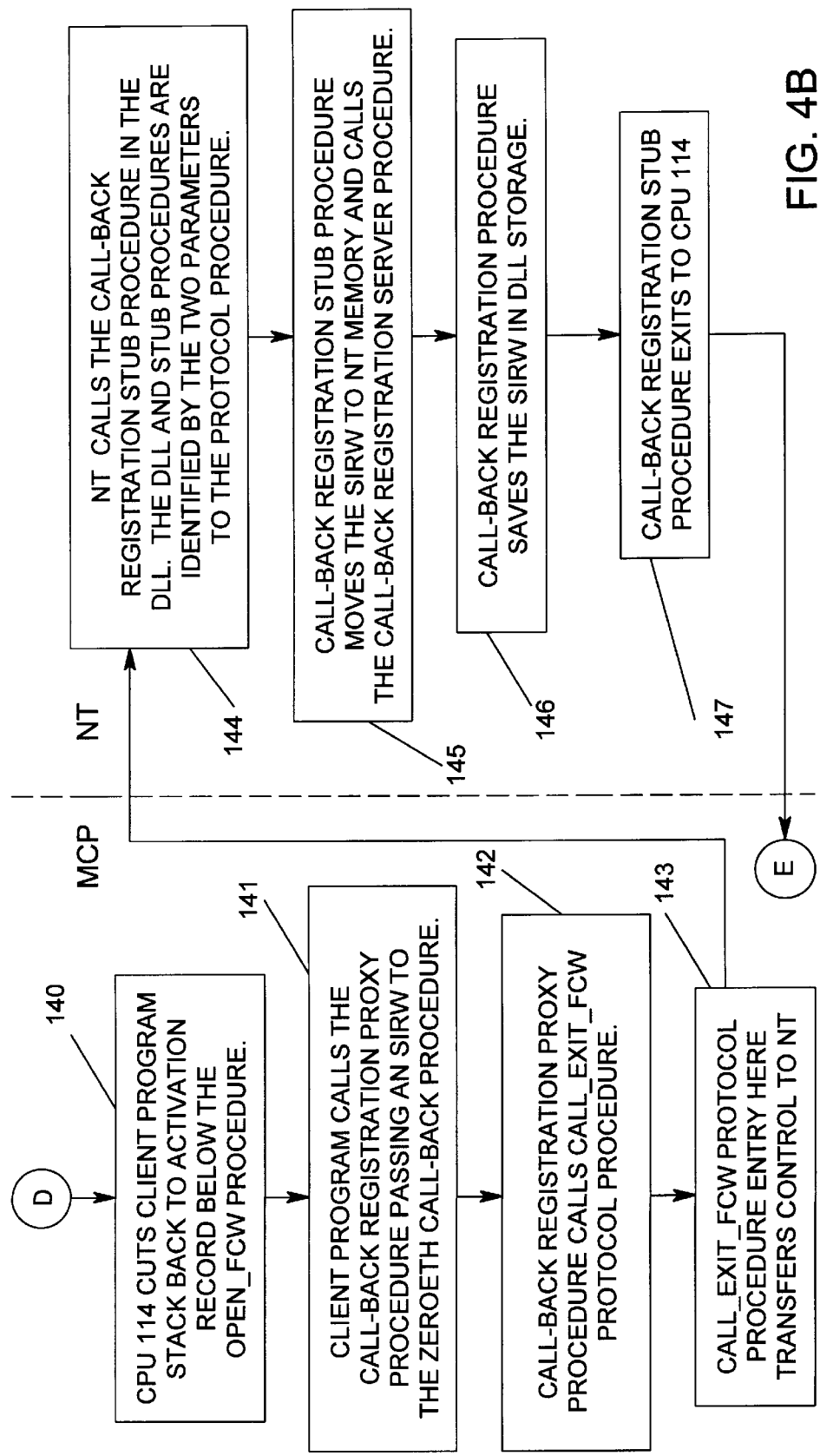

Referring now to FIG. 4B at the connector D, the CPU 114 cuts the Client Program stack back to an activation record below the Open_FCW Procedure (block 140/240, FIG. 5C). The Client Program then calls the Call-back Registration Proxy Procedure for passing thereto an SIRW to the zeroeth Call-back Procedure (block 141/241, FIG. 5C). Next, the Call-back Registration Proxy Procedure calls Call_Exit_FCW Protocol Procedure (block 142/242, FIG. 5D). Following this, entry into the Call_Exit_FCW Protocol Procedure transfers control back to the NT (block 143/243, FIG. 5E).

Figure 5A:
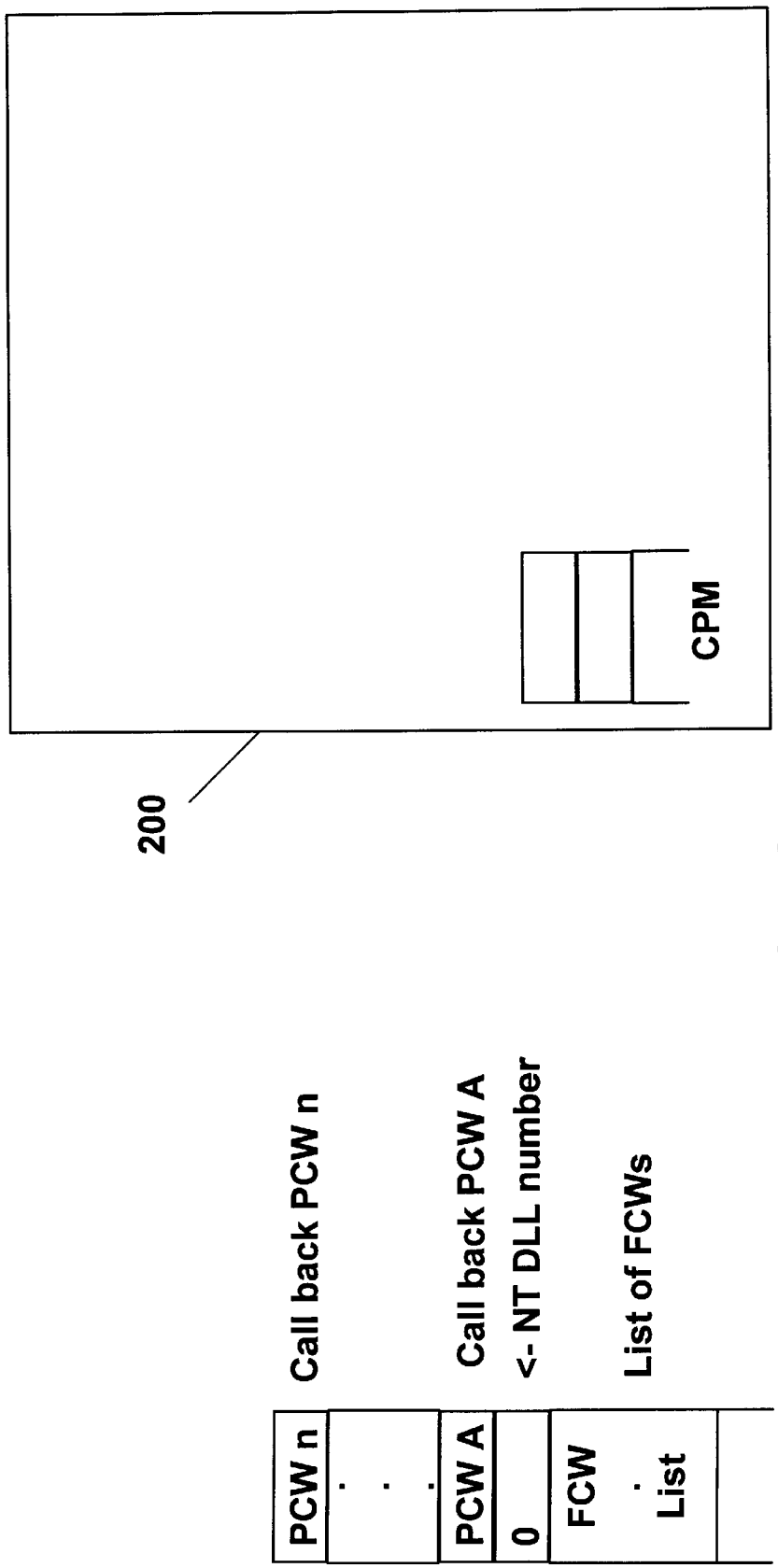
FIGS. 5A through 5AC (intentionally excluding the letters I and O so as to avoid confusion) illustrate the details of the method of the present invention.
Figure 5B:
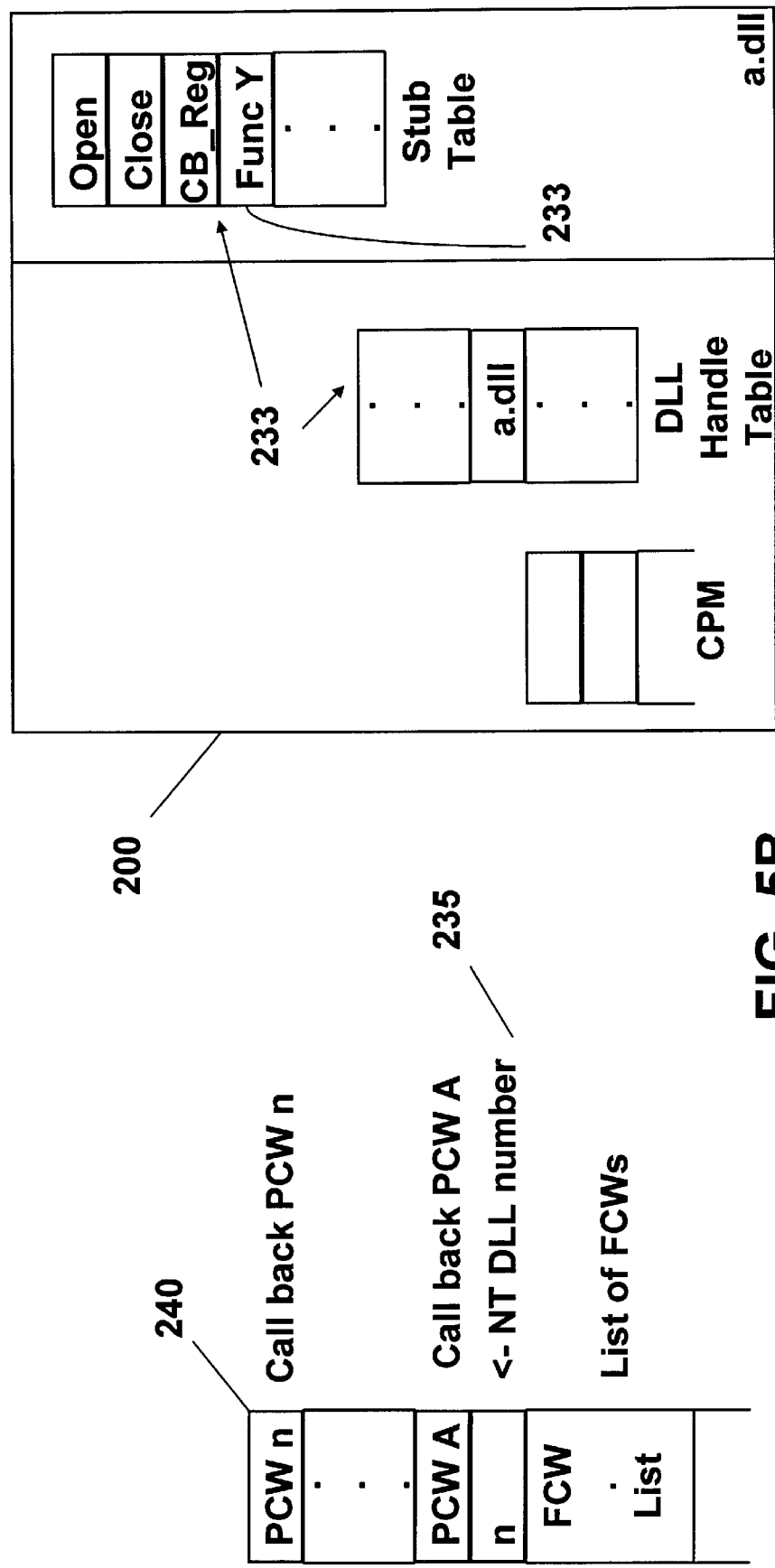
Figure 5C:
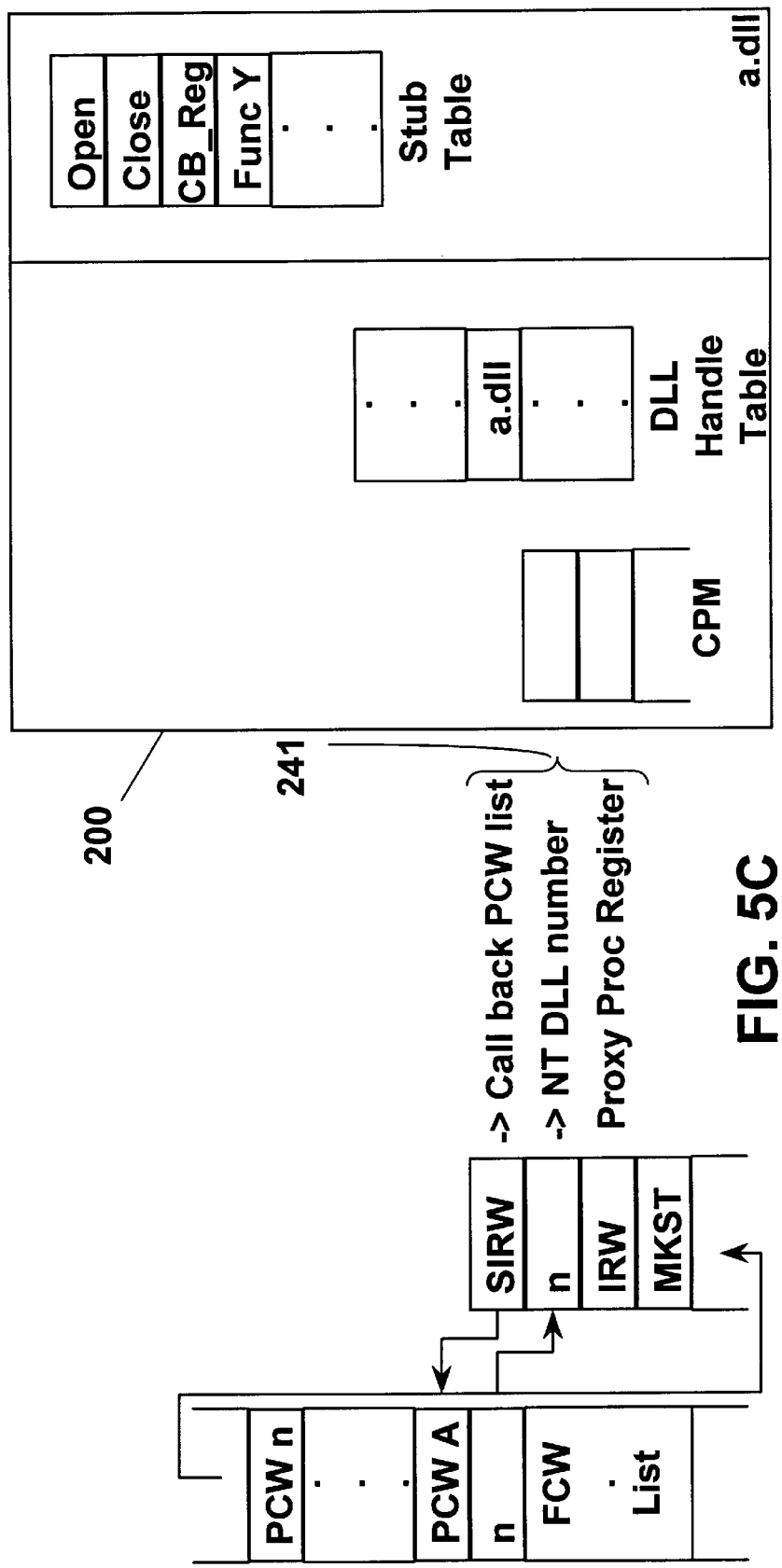
Figure 5D:
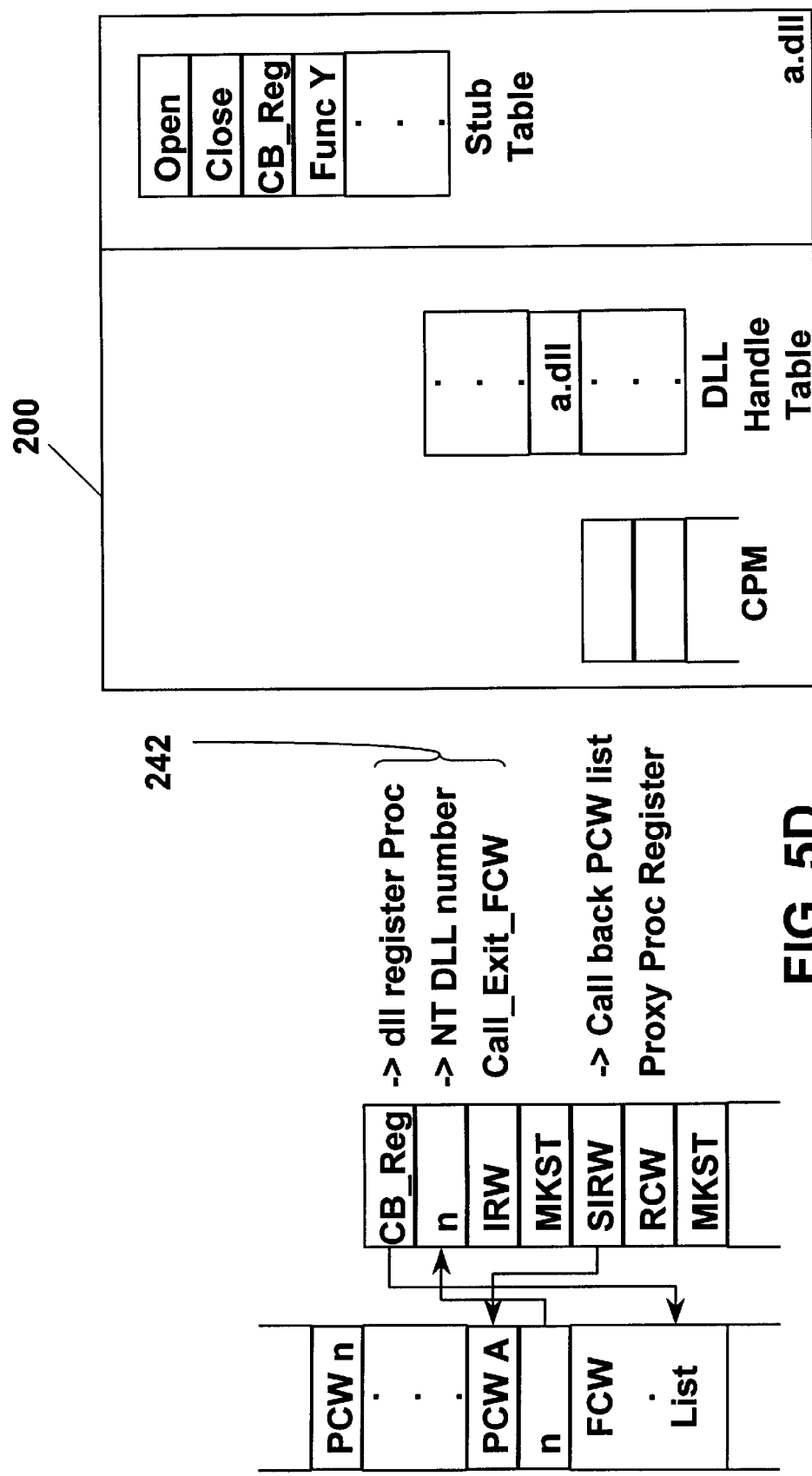
Figure 5E:
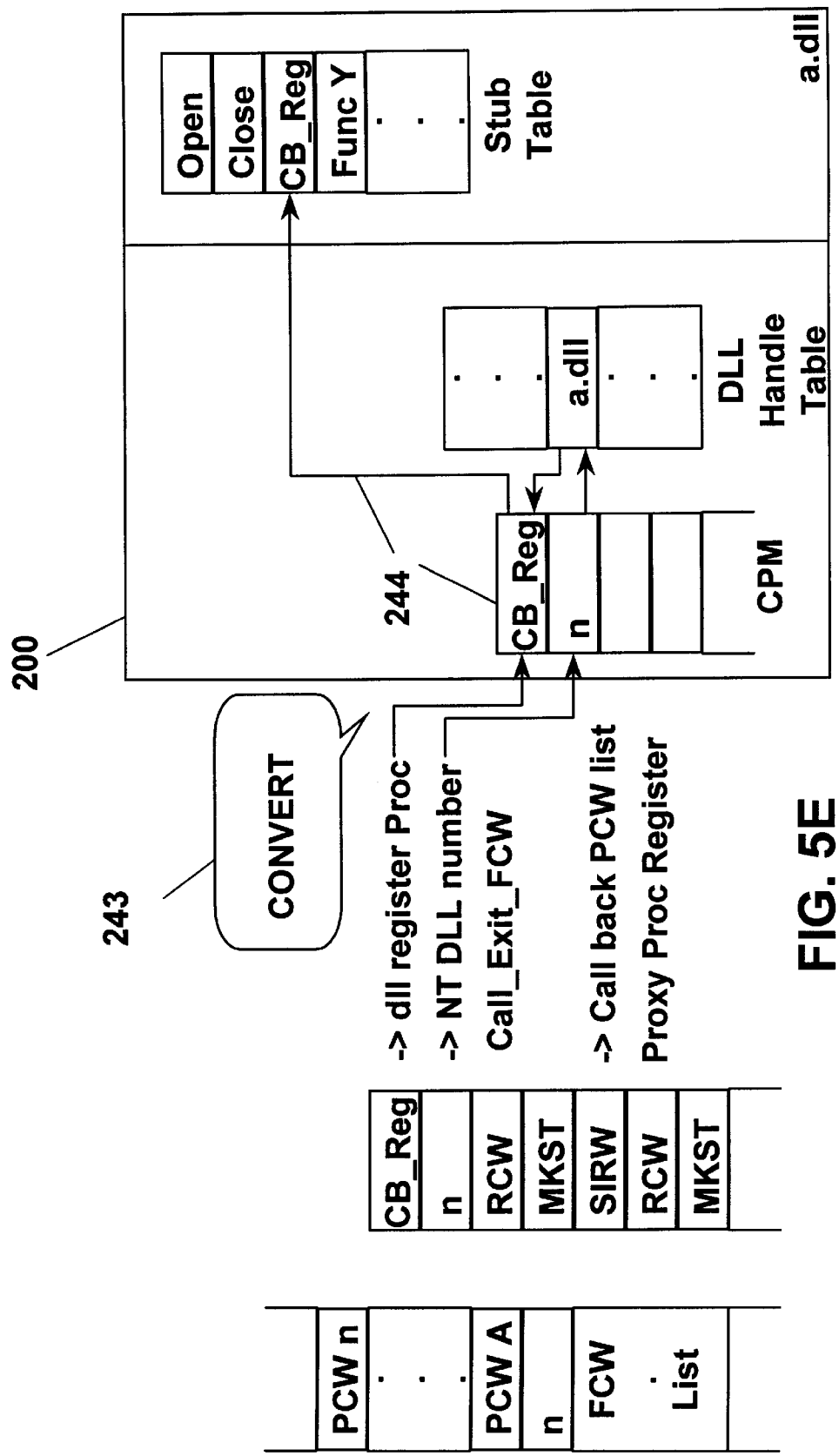
Figure 5F:
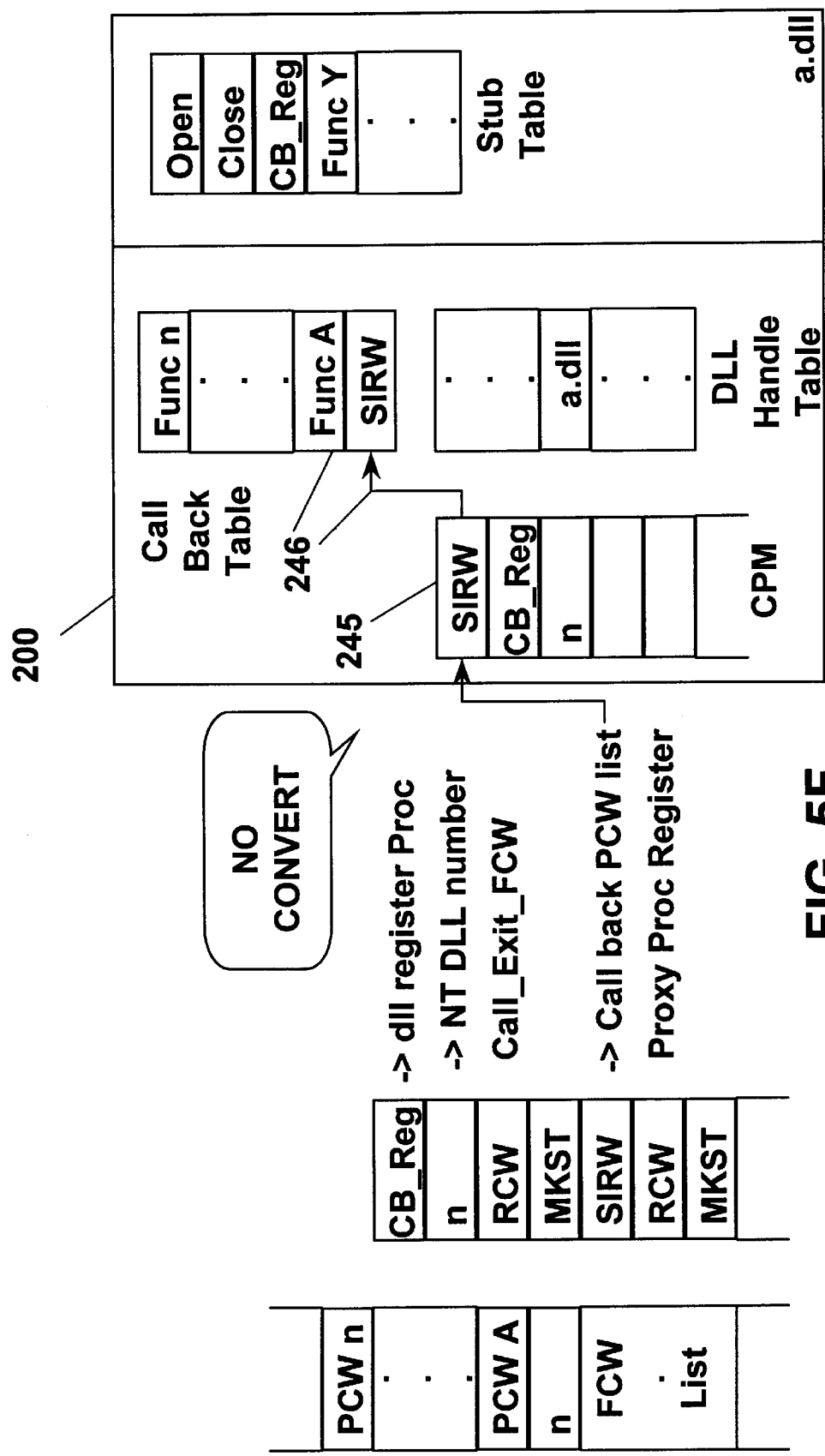
Figure 5G:
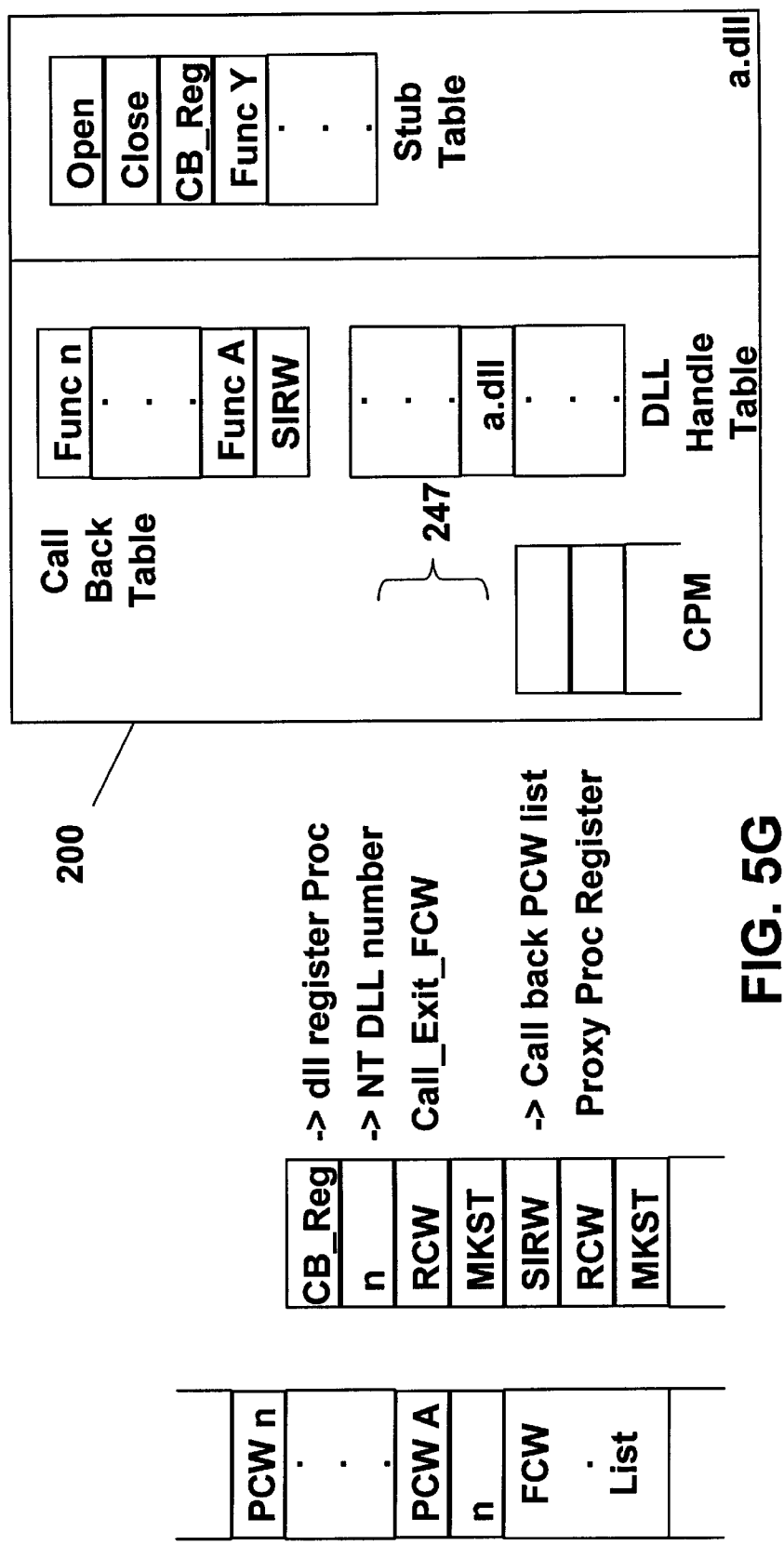

Following this, NT calls the Call-back Registration Stub Procedure in the DLL (block 144/244, FIG. 5E). The DLL and Stub Procedures are identified by the two parameters to the Protocol Procedure. Next, the Call-back Registration Stub Procedure moves the SIRW to the NT section of the memory 118 and calls the Call-back Registration Server Procedure (block 145/245, FIG. 5F). The Call-back Registration Procedure saves the SIRW in the DLL storage or the DLL section of the memory (block 146/246, FIG. 5F). Following this, the Call-back Registration Stub Procedure exits to the CPU 114 (block 147/247, FIG. 5G). Control is then returned to the MCP Operating System as depicted by a connector E and the description continues with reference to FIG. 4C.

Figure 5H:
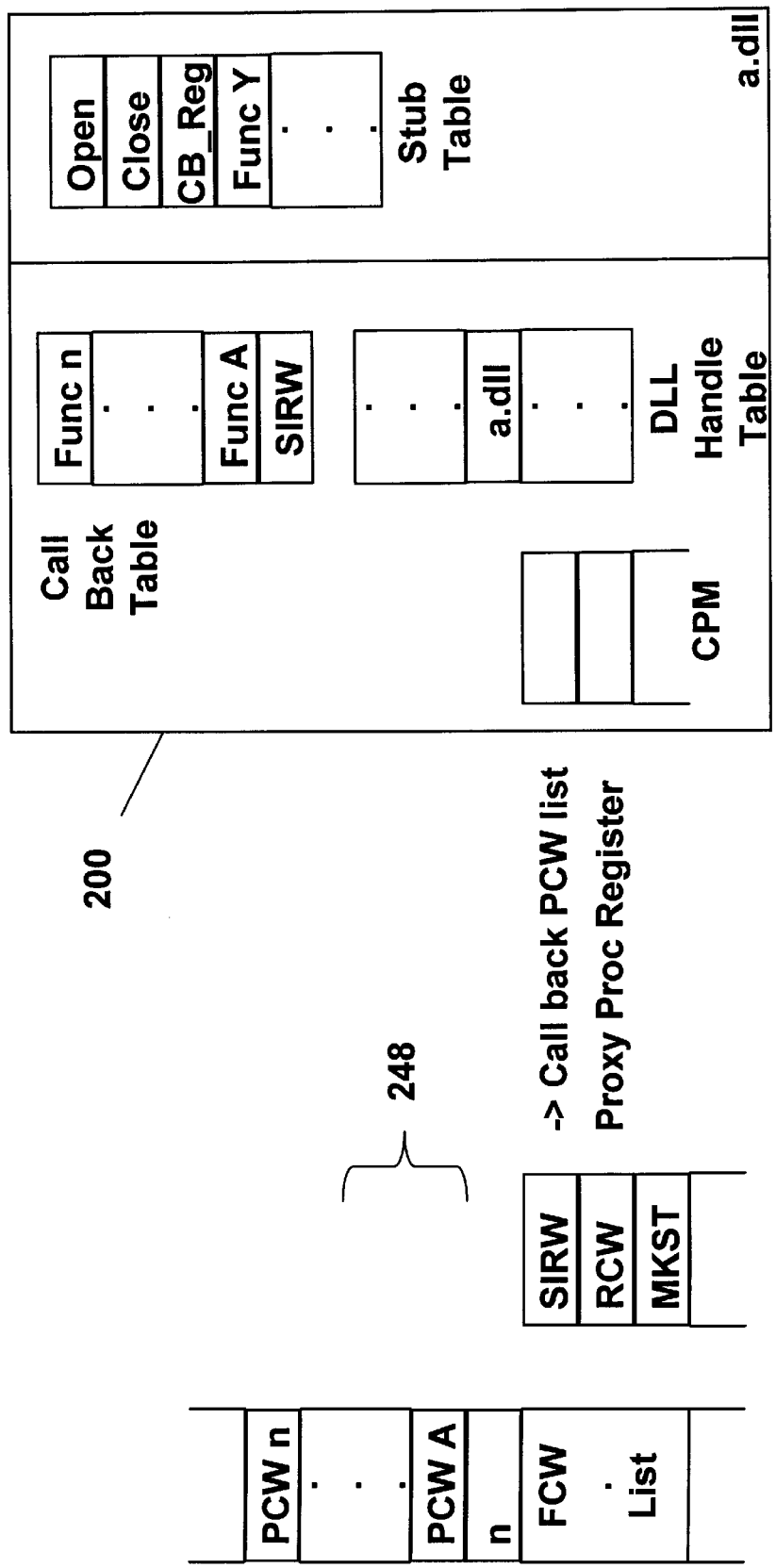
Figure 5J:
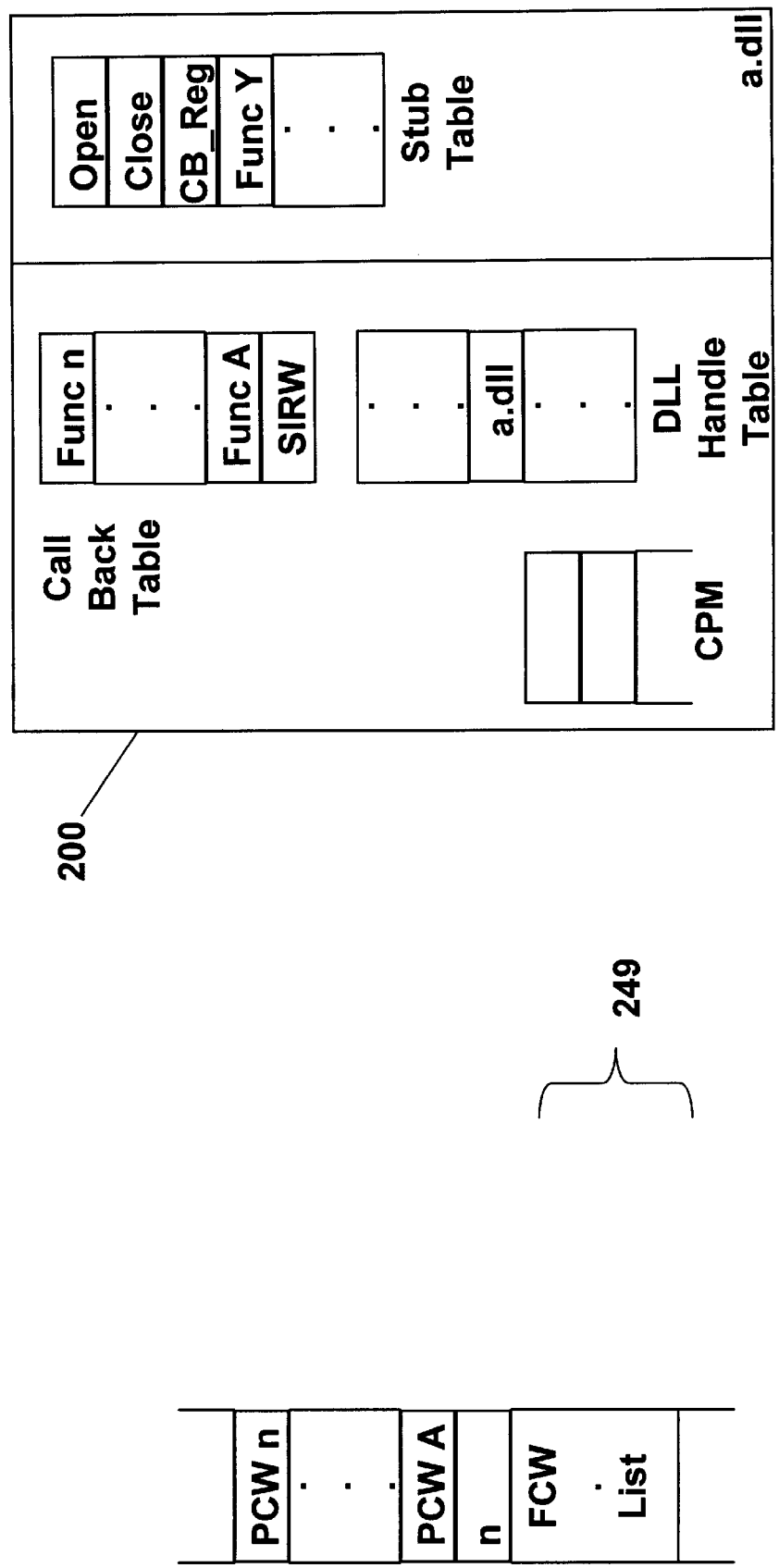
Figure 5K:
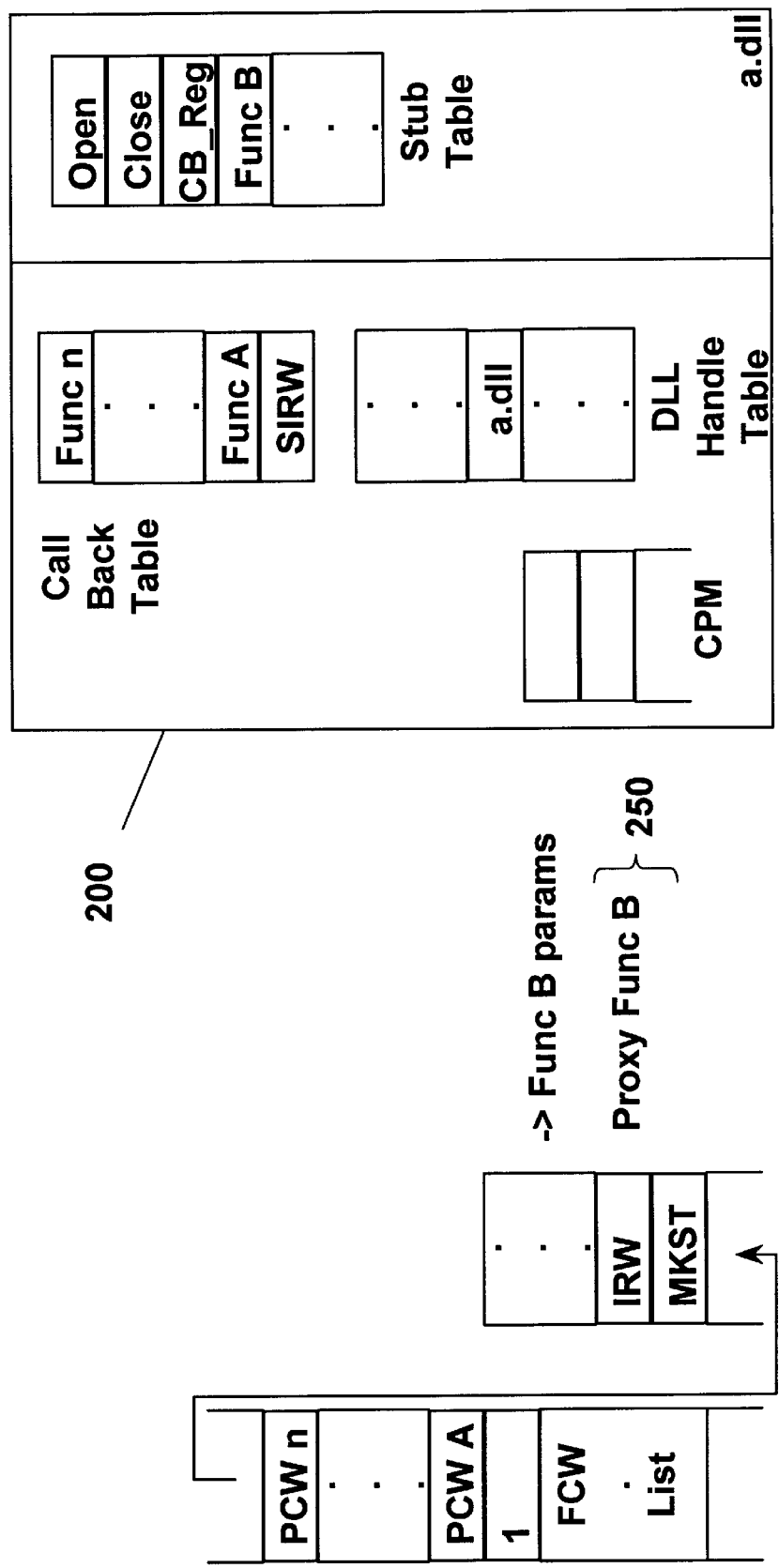

Referring now to FIG. 4C at the connector E, the CPU 114 cuts the Client Program stack back to the Call-back Registration Proxy Procedure activation record (block 148/248 FIG. 5H). The Call-back Registration Proxy Procedure then exits (block 149/249, FIG. 5J). Next, the Client Program calls the appropriate Proxy Procedure (block 150/250, FIG. 5K). That is, for the Server Program function B, there is a corresponding Proxy Procedure B. The Proxy Procedure then calls one of the Protocol Procedures used to invoke a Server Procedure on the NT Operating System (block 151/251, FIG. 5L). Following this, entry into the Protocol Procedure transfers control back to the NT Operating System (block 152/252, FIG. 5L).

Figure 5L:
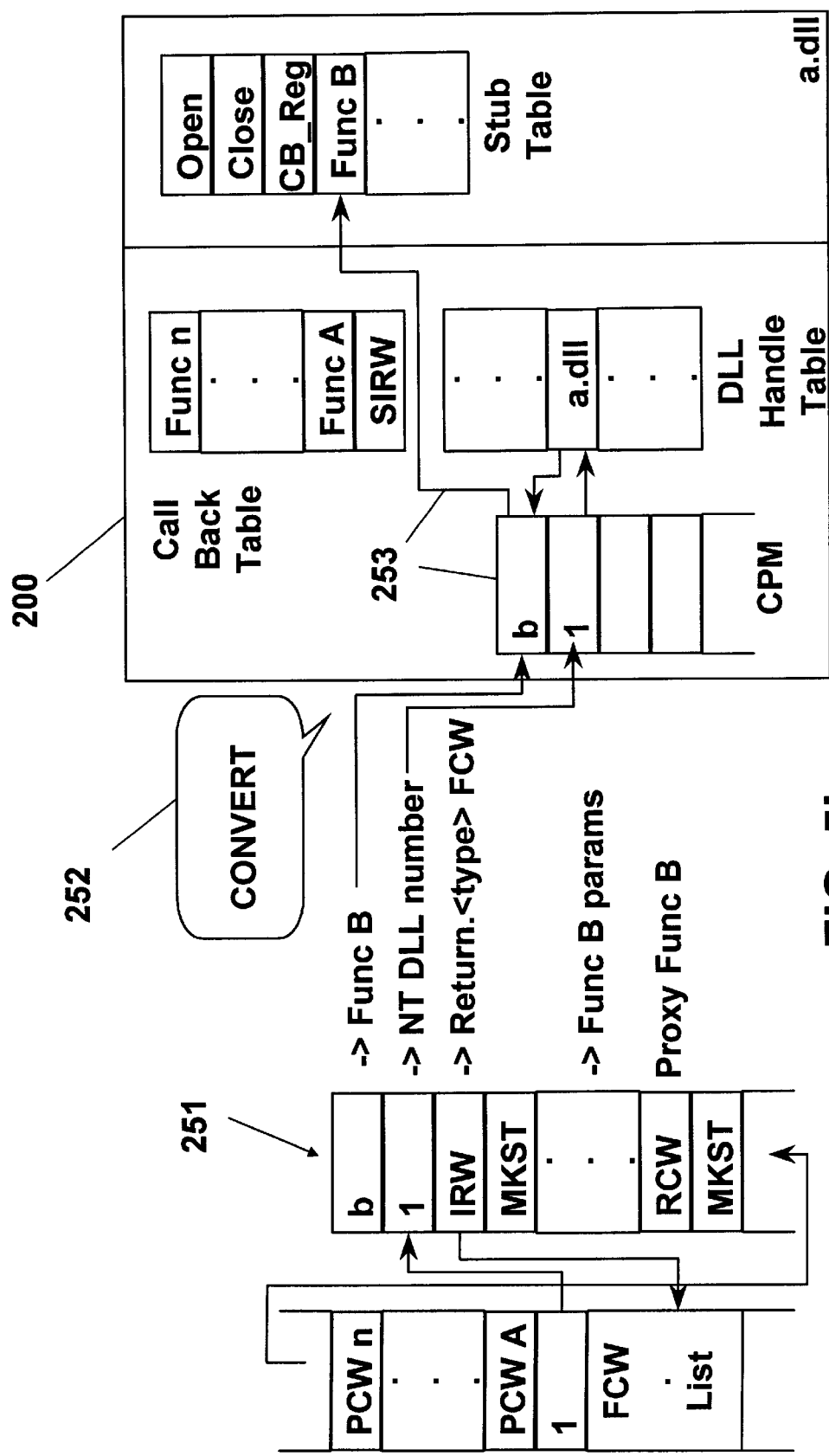
Figure 5M:
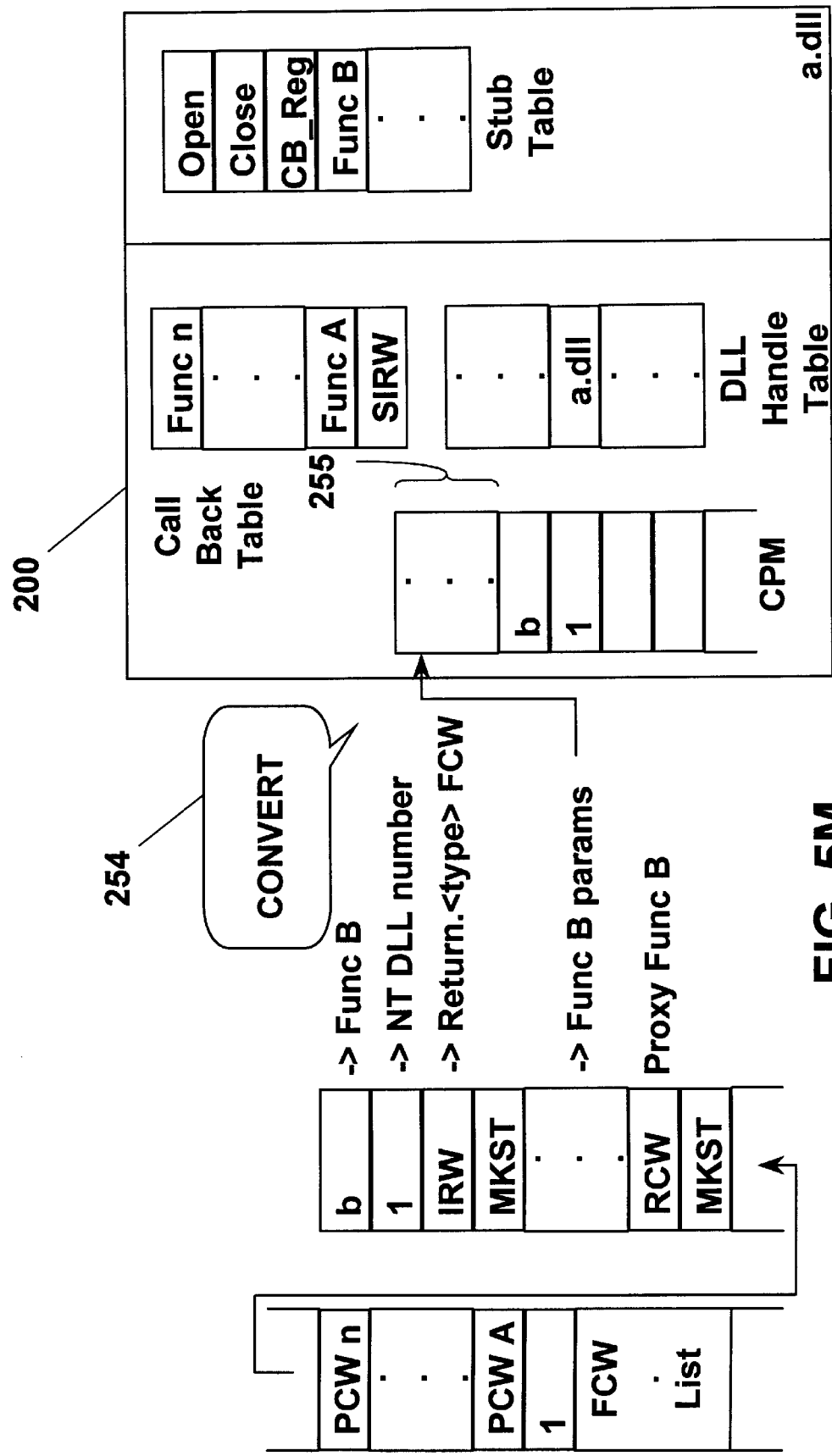
Figure 5N:
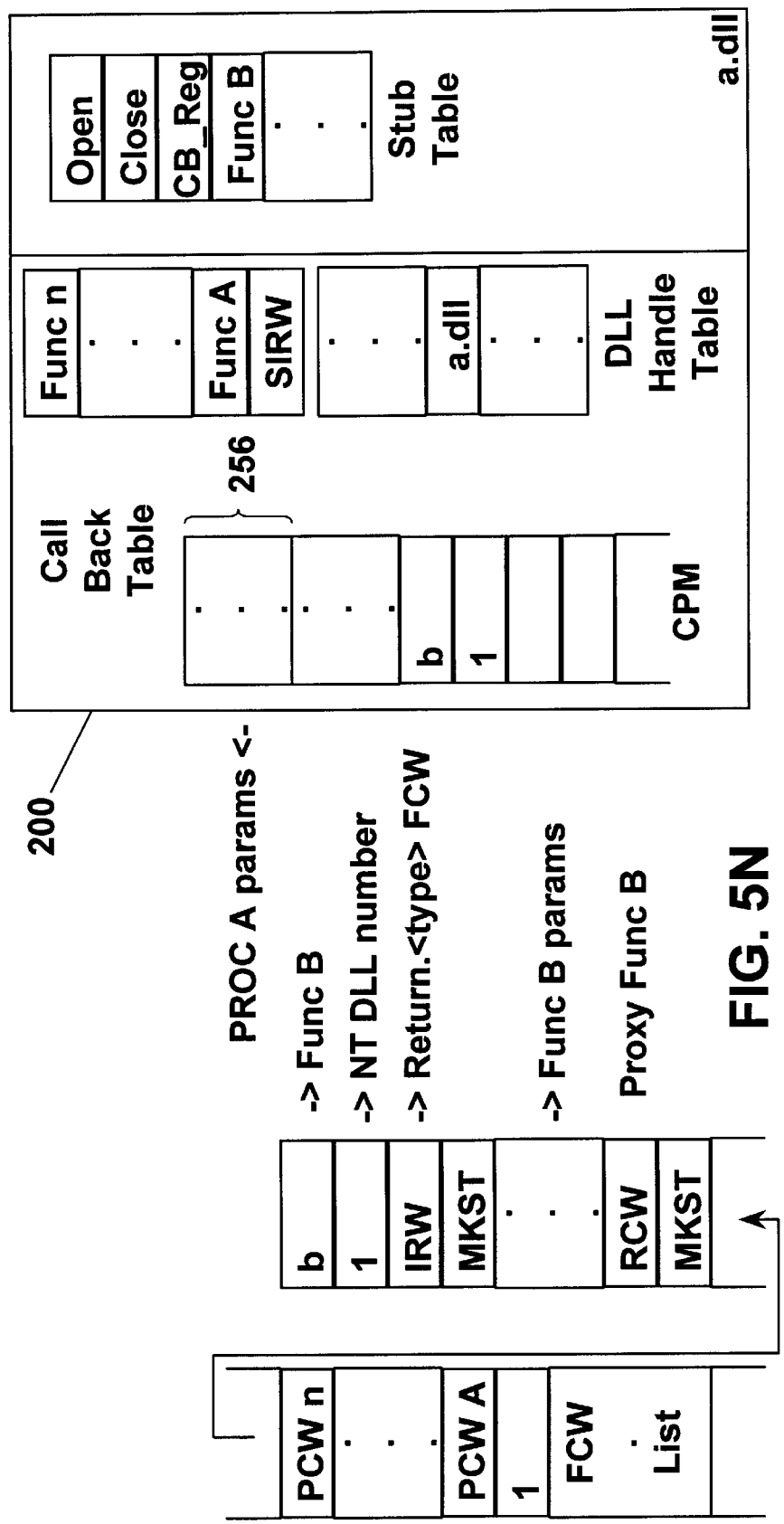

Within the NT operating system, the CPU 109 calls the Stub Procedure in the DLL (block 153/253, FIG. 5L). The DLL and Stub Procedures are identified by the two parameters to the Protocol Procedure. Next, the Stub Procedure converts the input parameters from the MCP format to the NT format as the data is moved from the MCP section of the memory 118 to the NT section of the same memory (block 154/254, FIG. 5M). The Stub Procedure then calls the Server Procedure (block 155/255 FIG. 5M). Following this, the Server Procedure performs the specified functions and calls the Proxy Procedure for the Call-back Procedure (block 156/256 FIG. 5N).

Figure 4D:
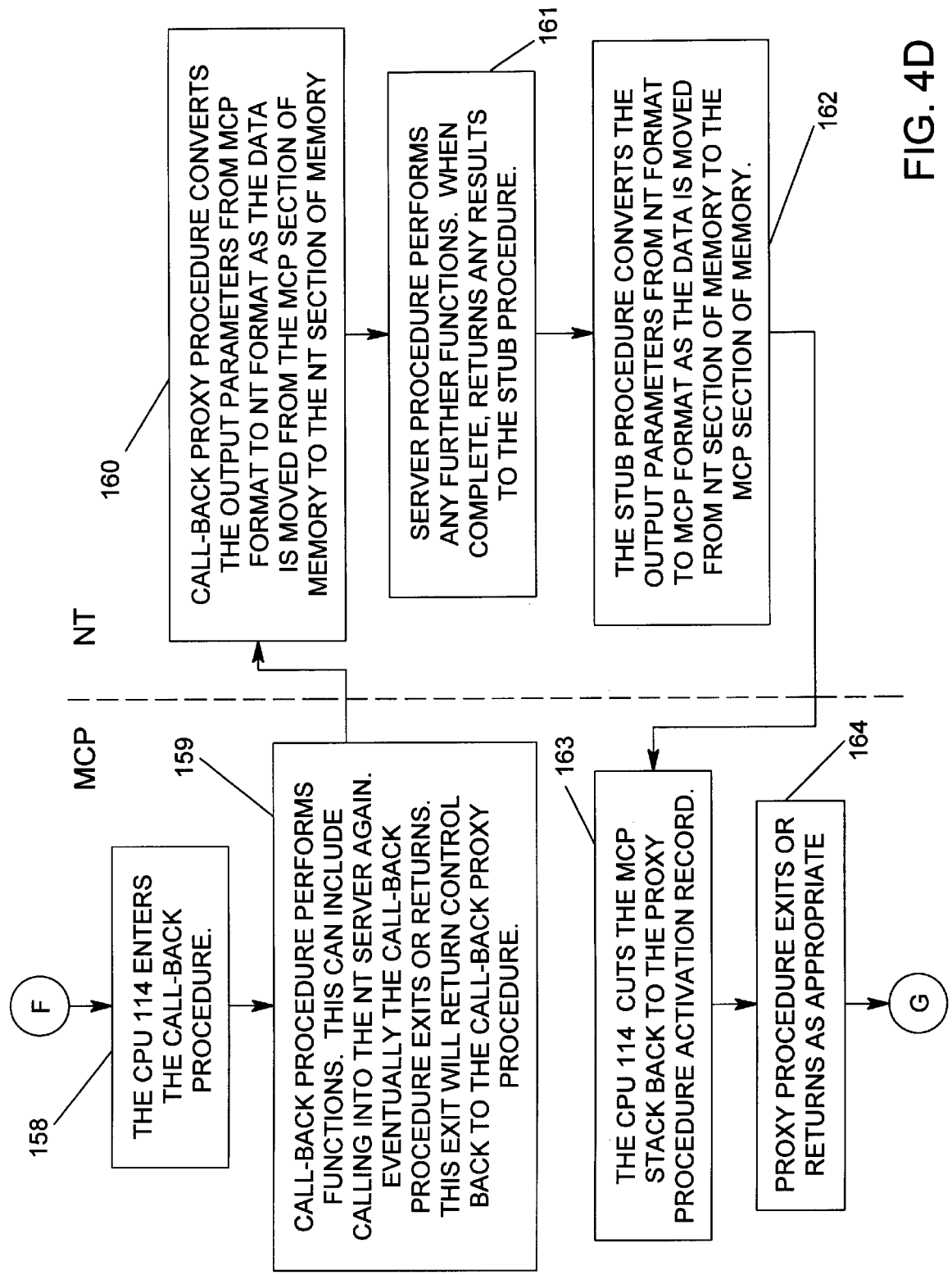
Figure 5P:
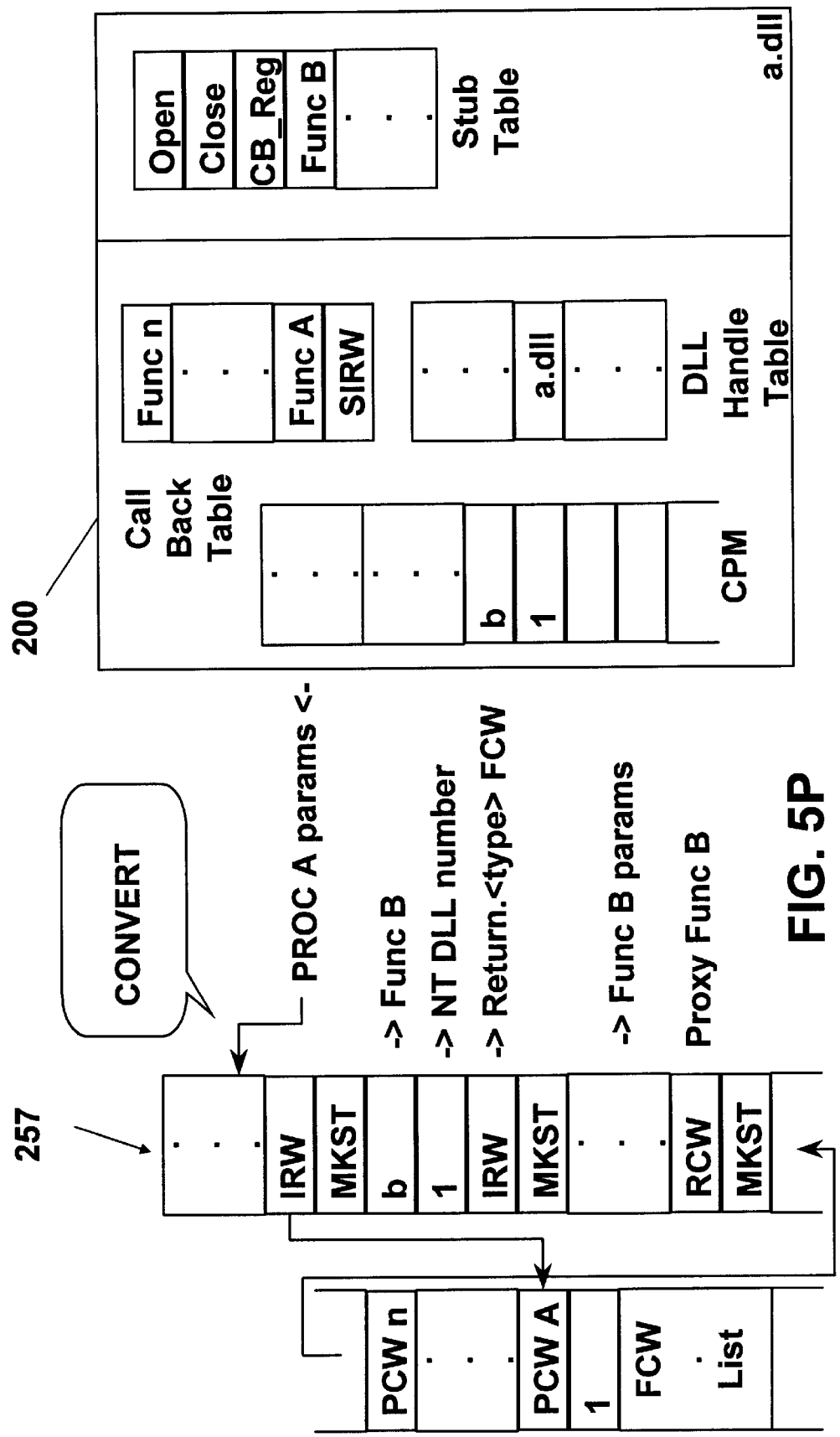

The Call-back Proxy Procedure builds a stack activation record on top of the Client Program stack above the Protocol Procedure; and then converts the input parameters from the NT format to the MCP format as data is moved from the NT section of the memory 118 to the MCP section of the same memory (block 157/257, FIG. 5P). The process continues in FIG. 4D as denoted by a connector F.

Figure 5Q:
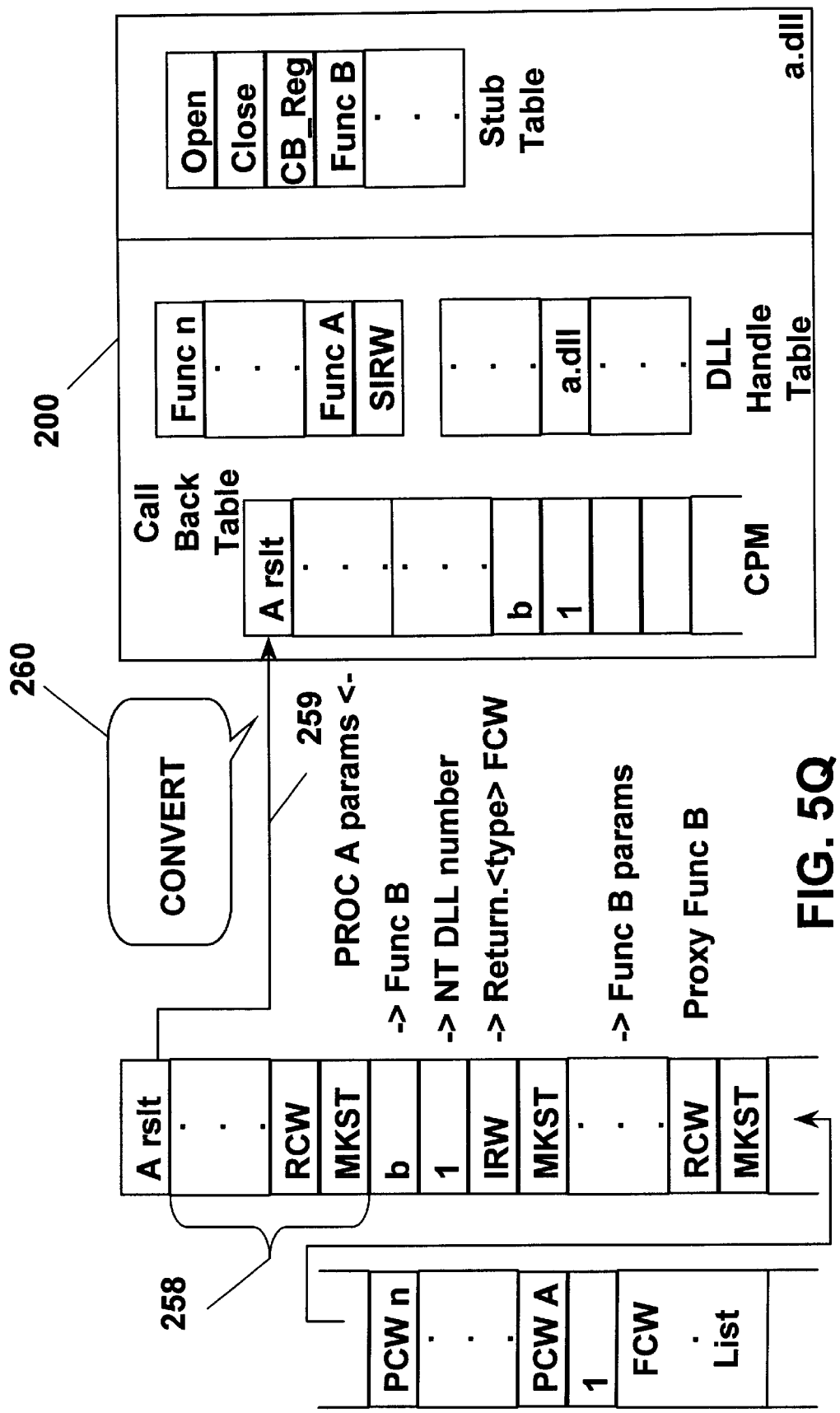

Referring now to FIG. 4D at the connector F and within the MCP Operating System, the CPU 114 enters the Call-Back Procedure (block 158/258, FIG. 5Q). It is noted that in the disclosed embodiment of the invention, an optimization has been taken to bypass the Client Program Stub Procedure. In the disclosed embodiment, the Client Program Stub Procedure performs no task other than calling the actual Client Program function, and the Server Program Proxy Function is able to effect the call on its own. Therefore, the Client Program Stub Procedure, while logically present, is actually empty and omitted. Back within the MCP, the Call-Back Procedure performs any necessary functions, which can include calling into the NT Server again. Eventually, the Call-back Procedure exits or returns. Such an exit or return will return control back to the Call-Back Proxy Procedure in the NT (block 159/259, FIG. 5Q).

Figure 5R:
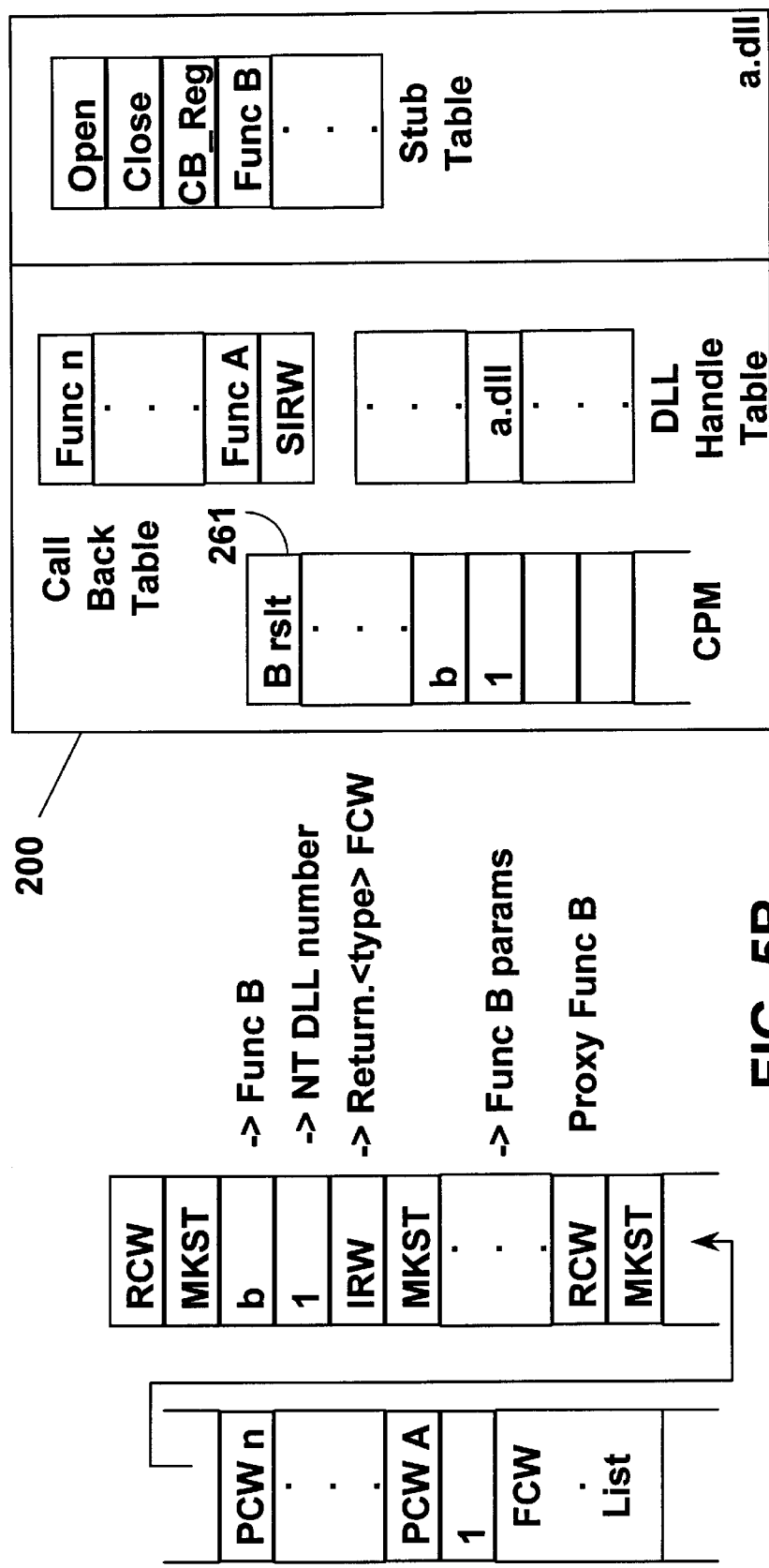
Figure 5S:
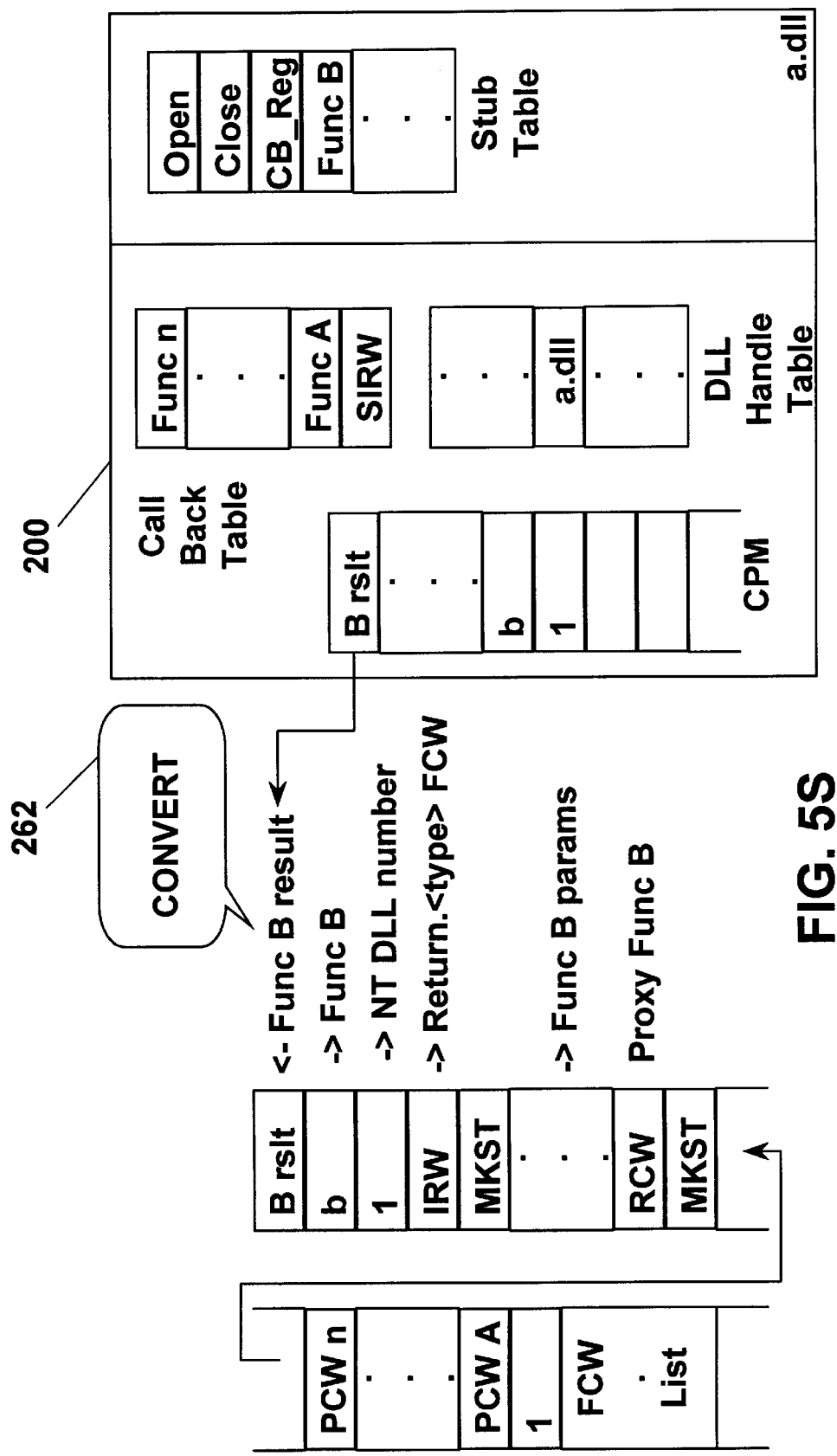
Figure 5T:
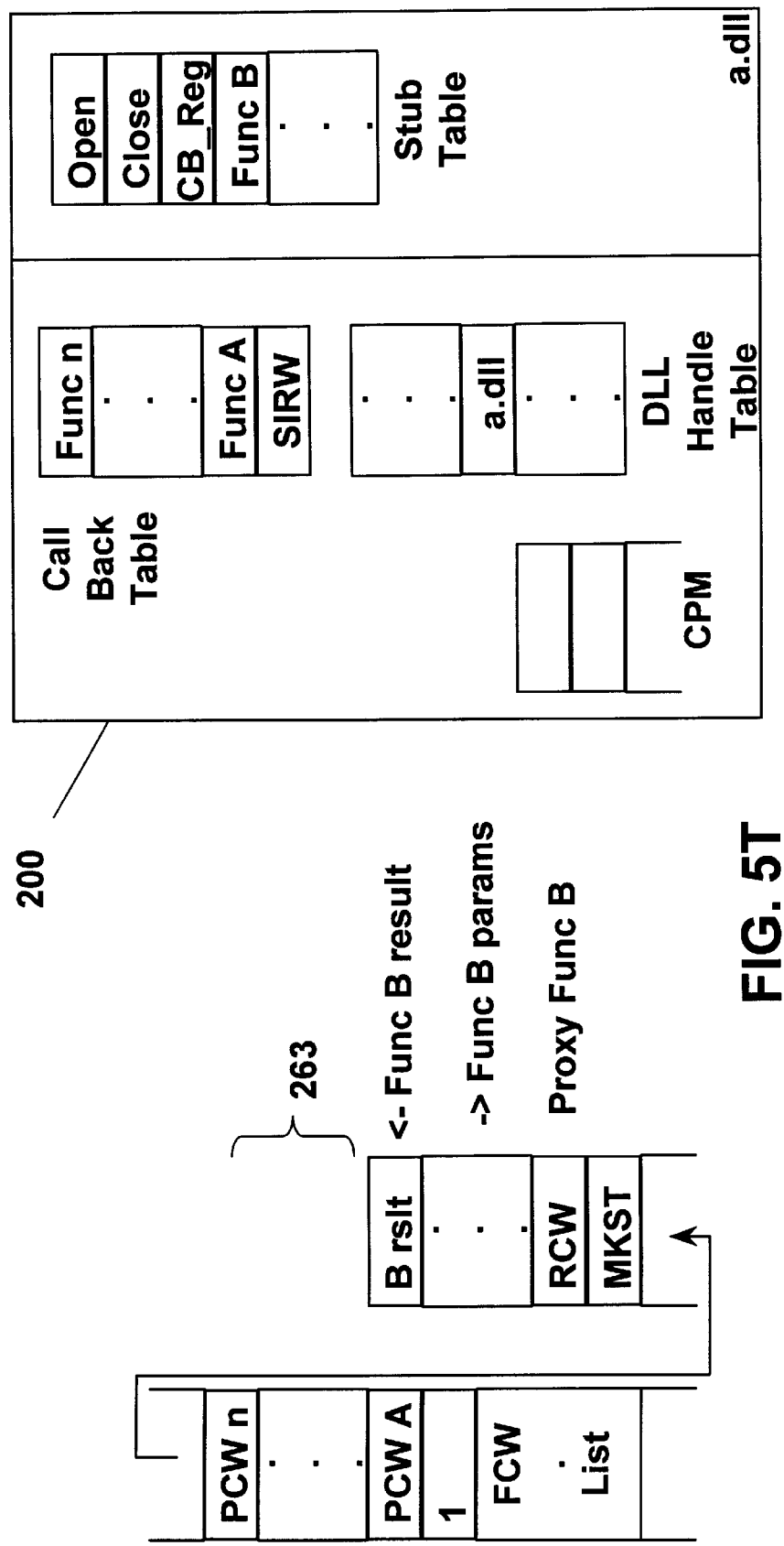
Figure 5U:
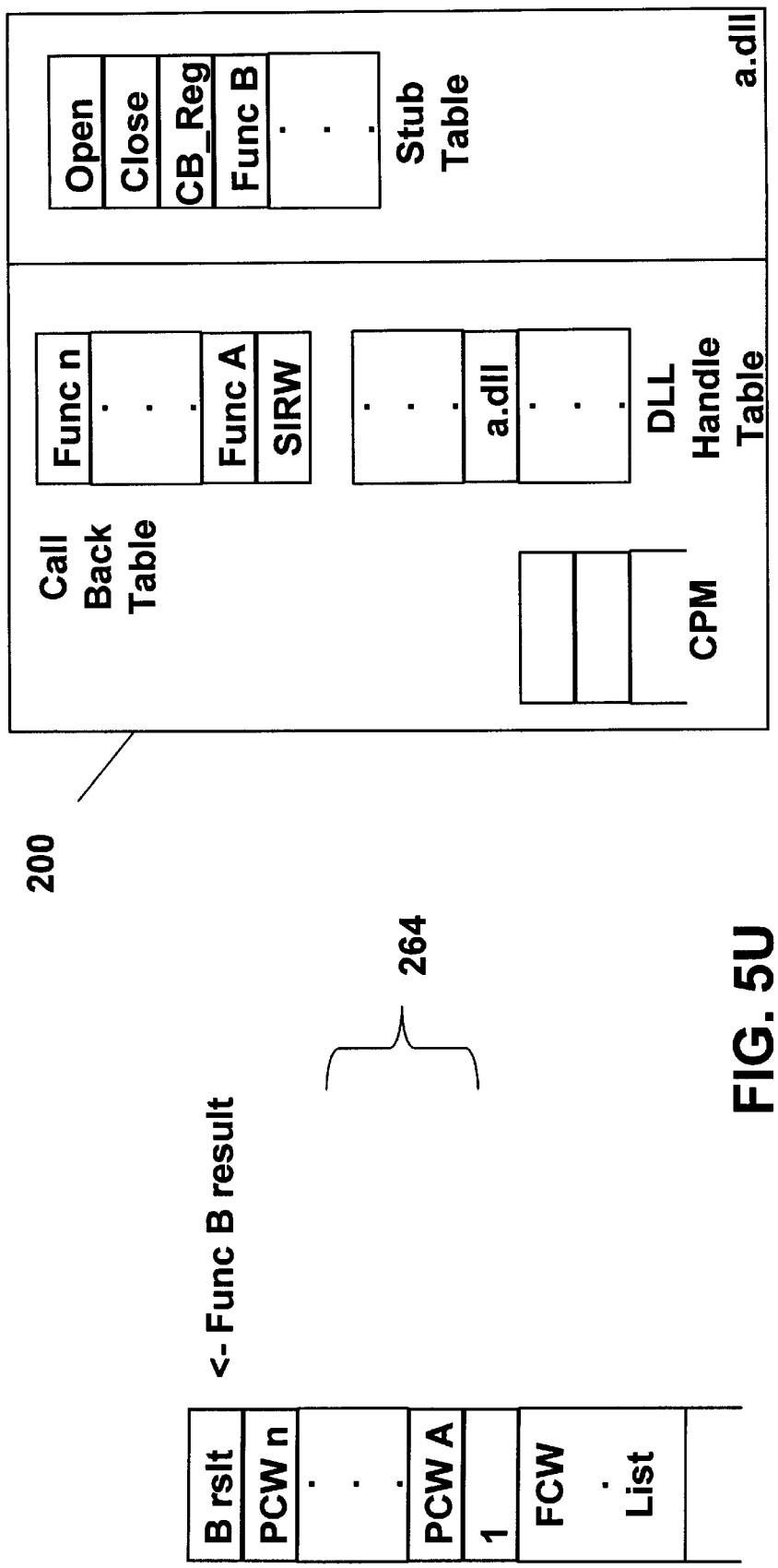

Returning back to NT, the Call-Back Proxy Procedure converts the output parameters from the MCP format to the NT format as the data is moved from the MCP section of the memory 118 to the NT section of the same memory (block 160/260, FIG. 5Q). Next, the Server Procedure performs any further functions (block 161/261, FIG. 5R). For example, the Server Procedure could call the same Client Program function again (perhaps passing different parameters). Alternatively, the Server Program could call other local or external functions. The Server Program does whatever the programmer wrote it to do, which can include additional calls to an external (e.g., Call-back) procedure, or to an external Server procedure in a completely different program. When the Server Procedure is complete, it exits, returning any results to the Stub Procedure. Following this, the Stub Procedure converts the output parameters from the NT format to the MCP format as the data is moved from the NT section of the memory 118 to the MCP section of the same memory (block 162/262, FIG. 5S). Returning back to the MCP, the CPU 114 cuts the MCP stack back to the Proxy Procedure activation record (block 163/263, FIG. 5T). Next, the Proxy Procedure exits or returns as appropriate (block 164/264, FIG. 5U). The process continues on the next sheet in FIG. 4E at a connector G.

Figure 5V:
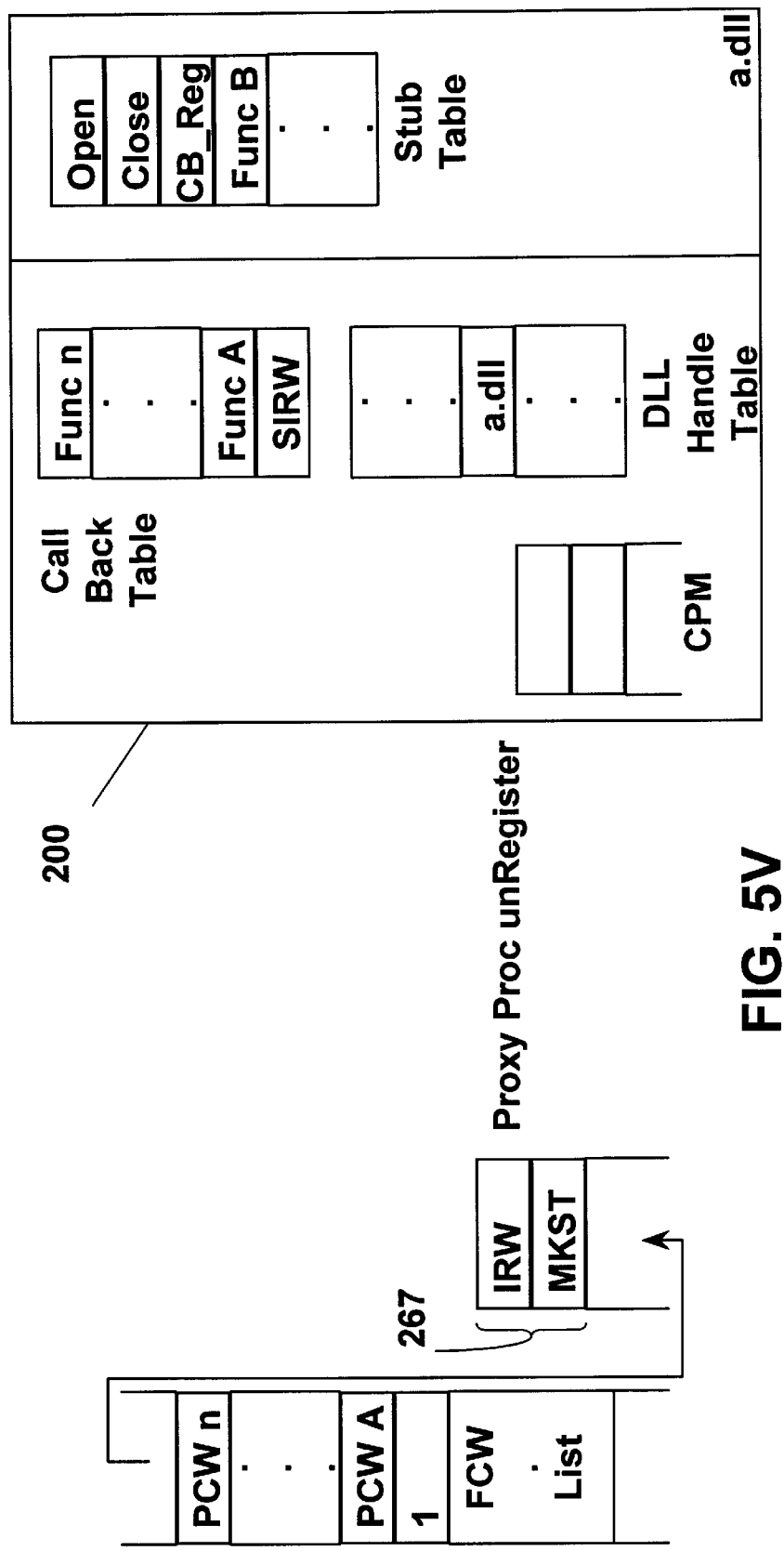
Figure 5W:
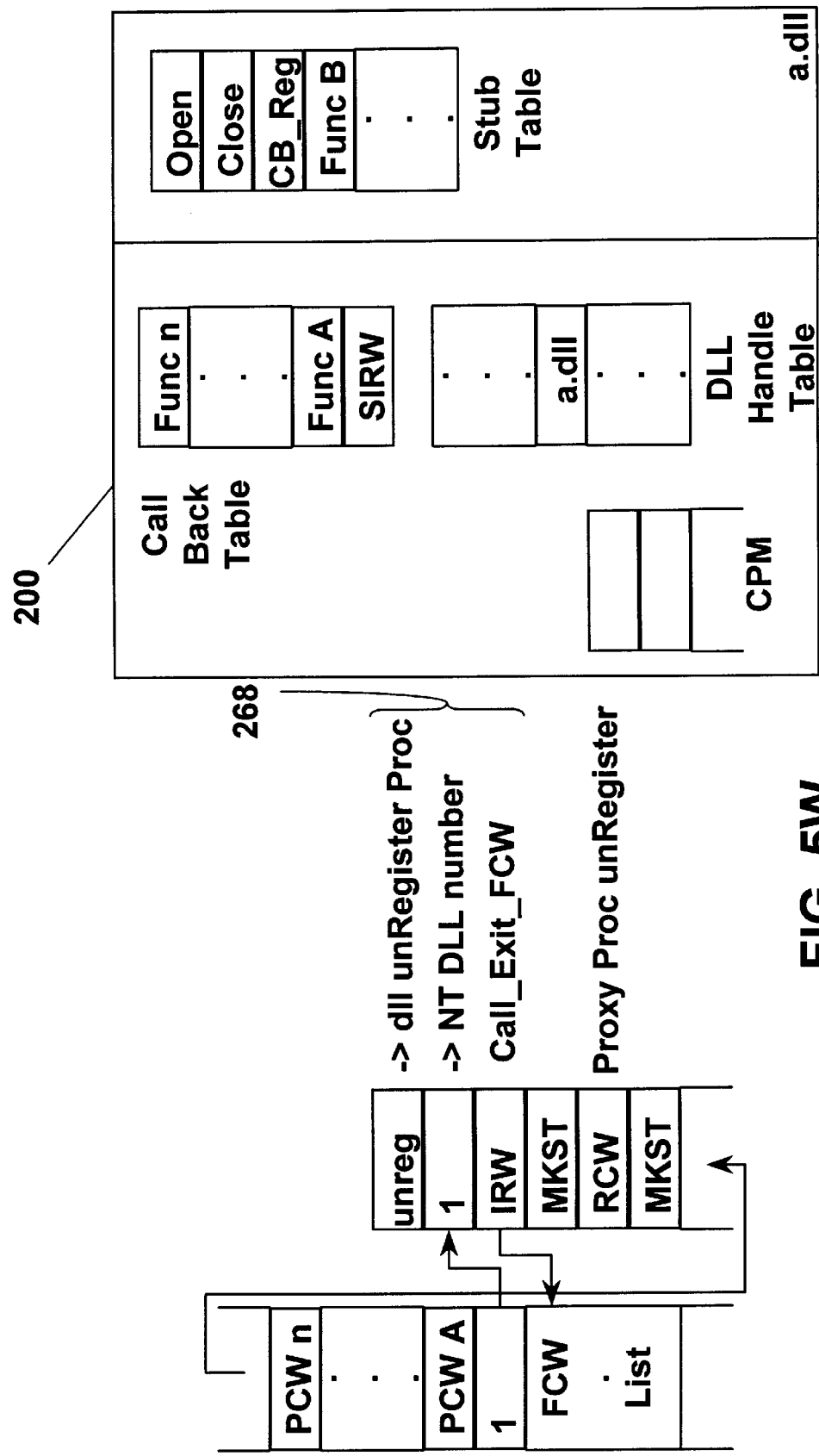

Referring now to FIG. 4E at the connector G, the Client Program continues normal processing, including making additional calls on the Proxy Procedures as necessary (block 165). At this juncture an inquiry is made as to whether or not there are more Server Program functions to call (diamond 166). If the answer to this inquiry is yes, then a branch is made back to block 150, FIG. 4C (connector K). On the other hand if the answer is no then the Client Program calls the Call-Back Unregistration Proxy Procedure (block 167/267, FIG. 5V). The Call-Back Unregistration Proxy Procedure then calls Call_Exit FCW Protocol Procedure (block 168/268, FIG. 5W). Entry into the Call_Exit_FCW Protocol Procedure transfers control to the Windows NT Operating System (block 169/269, FIG. 5X).

Figure 4F:
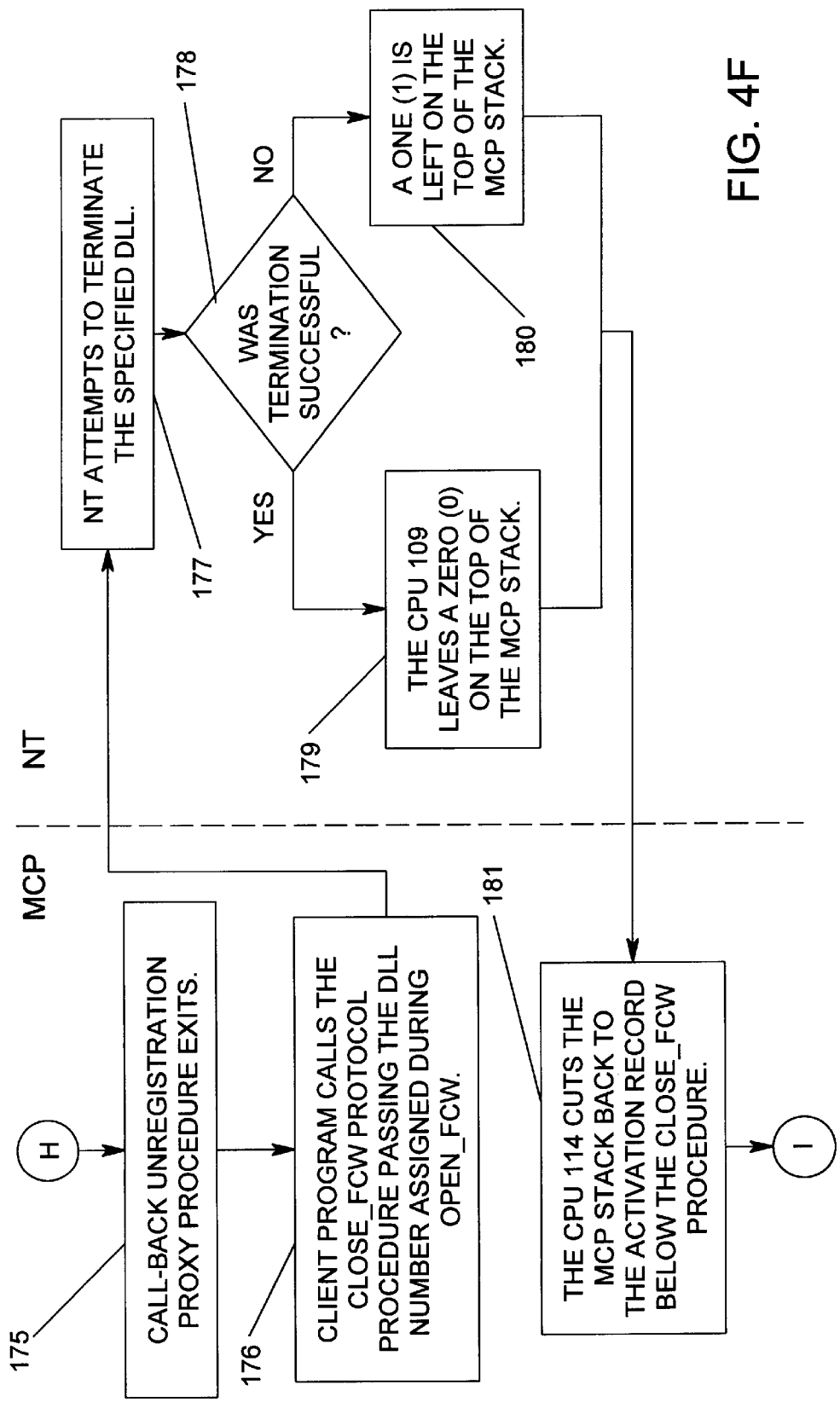
Figure 5X:
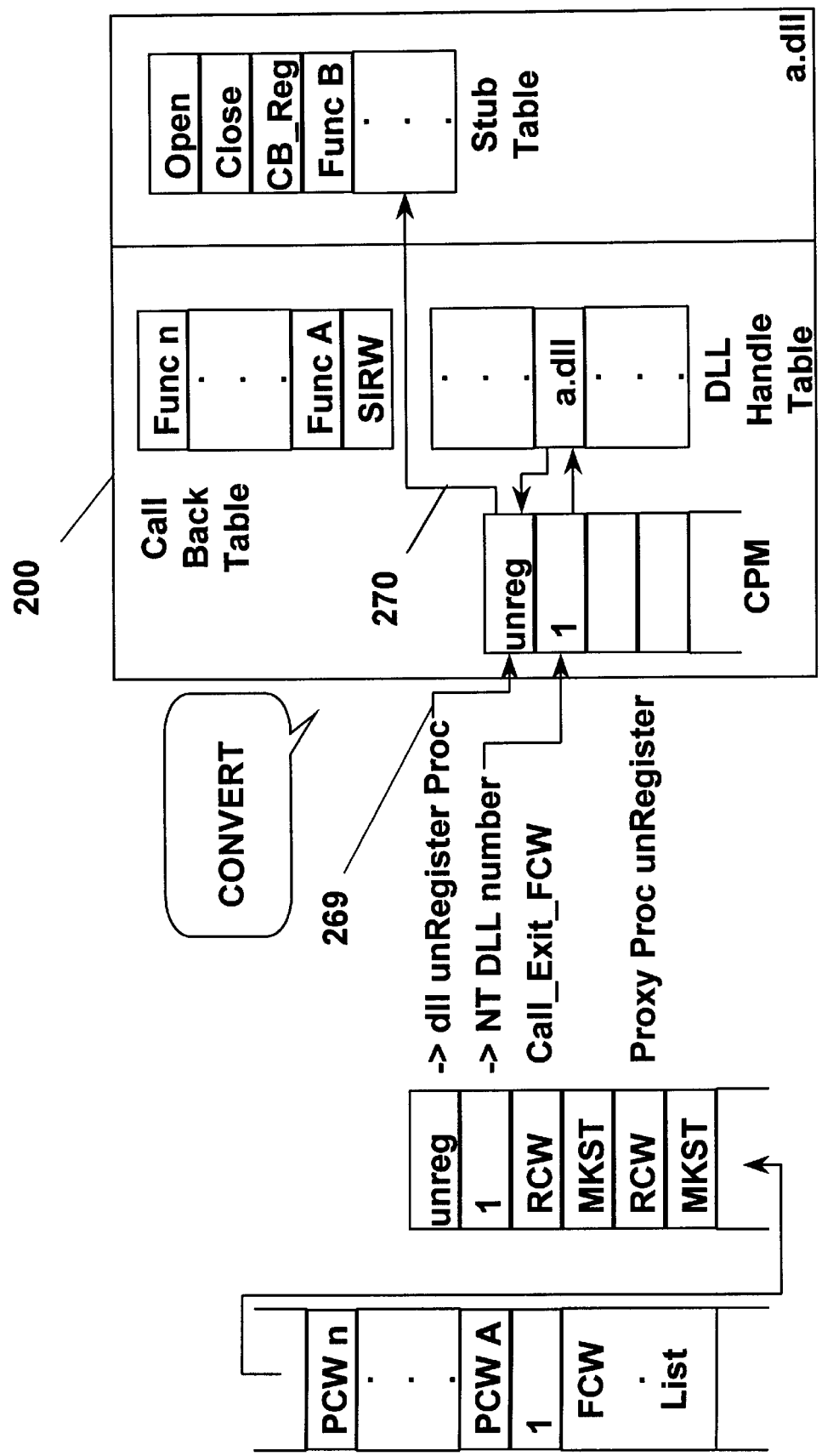
Figure 5Y:
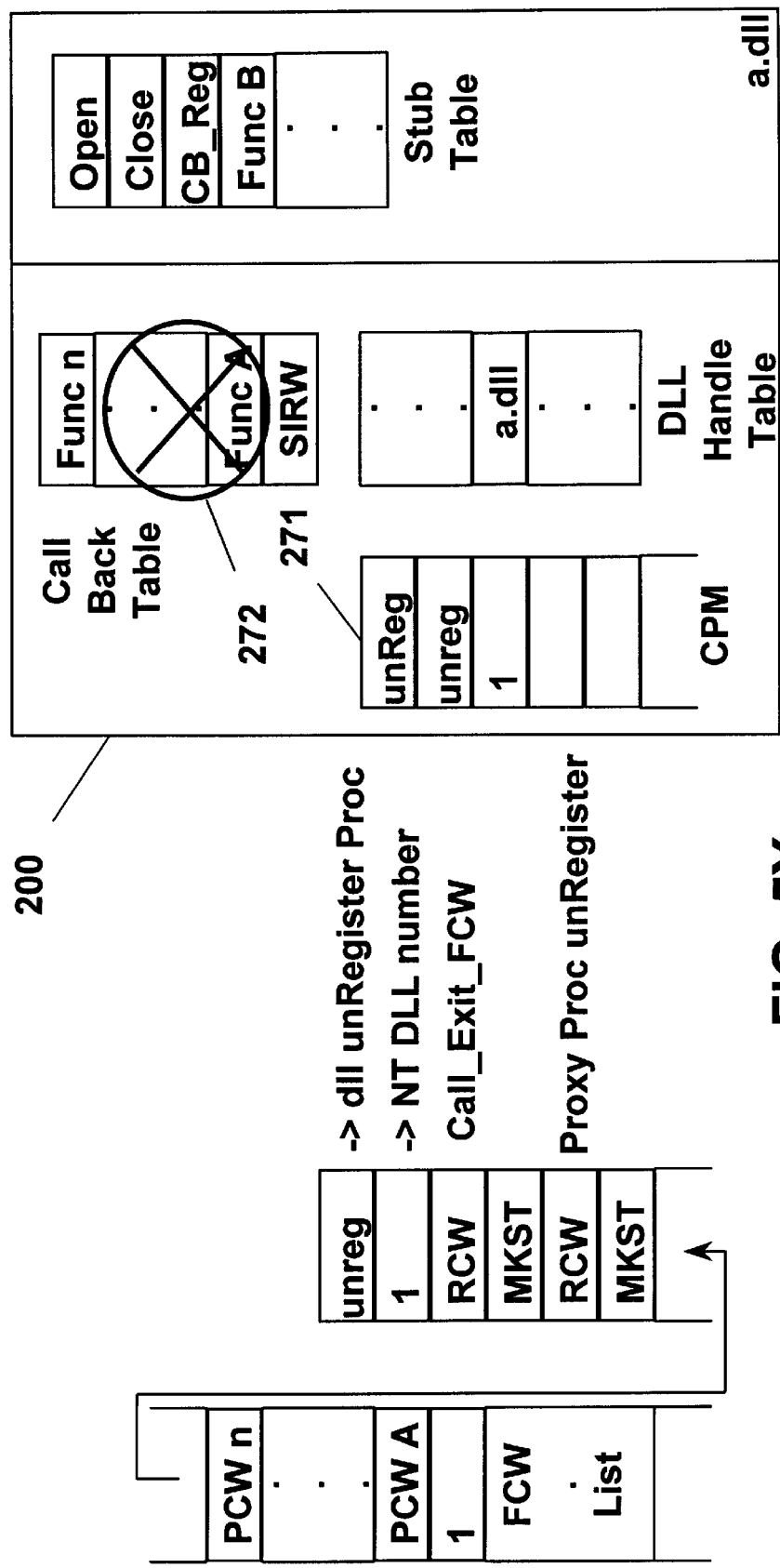
Figure 5Z:
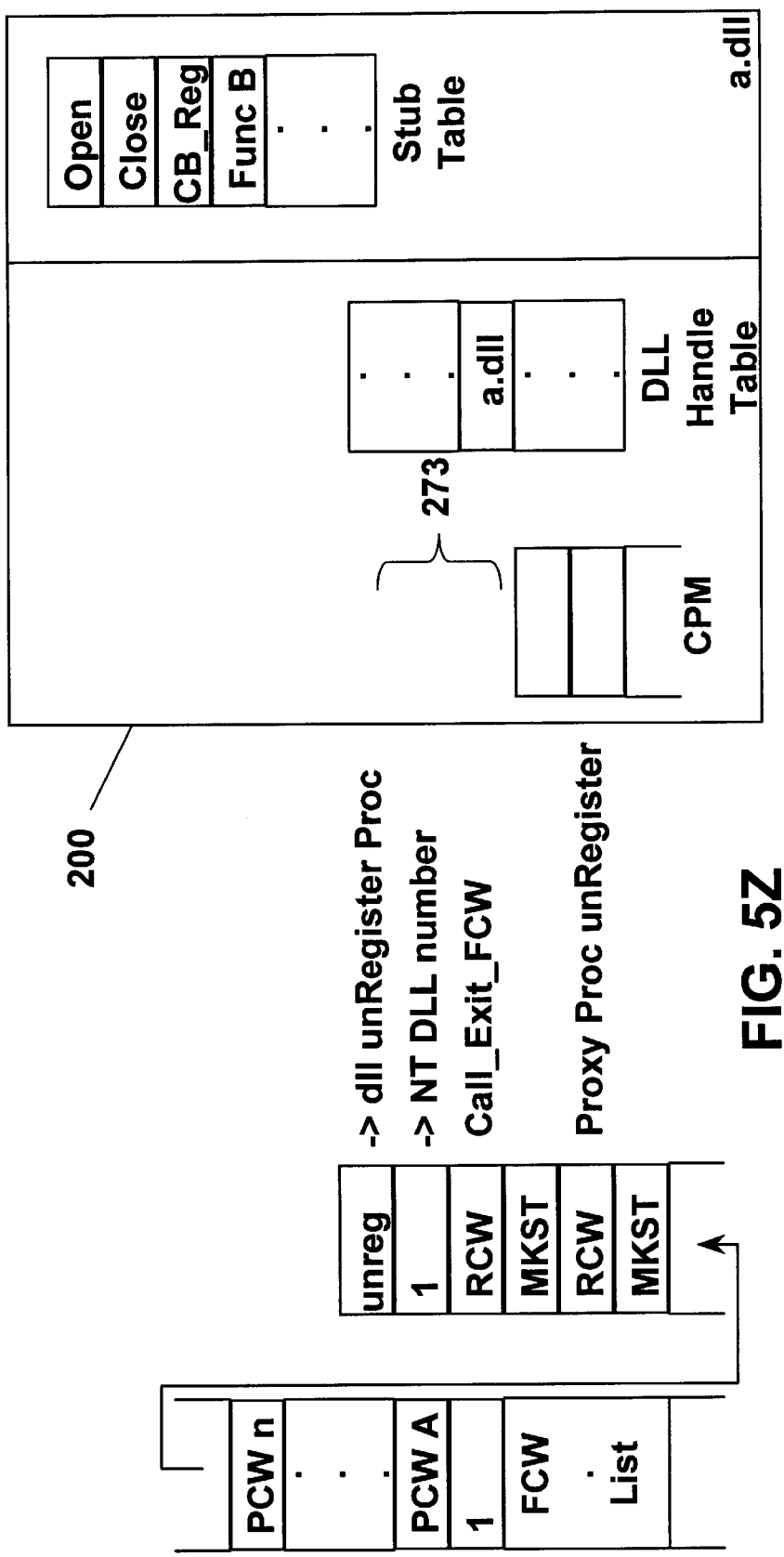
Figure 5A:
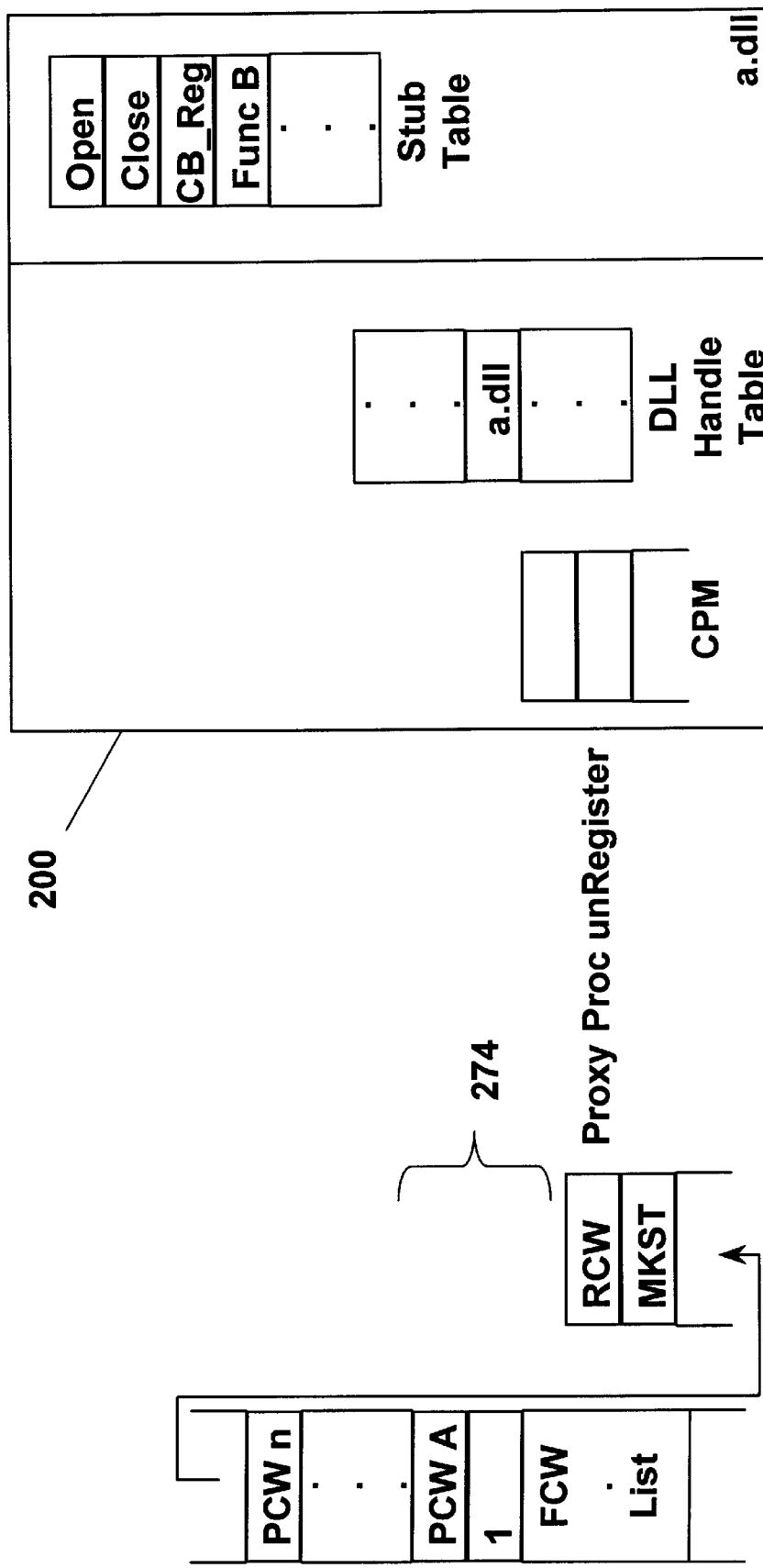
Figure 5A:
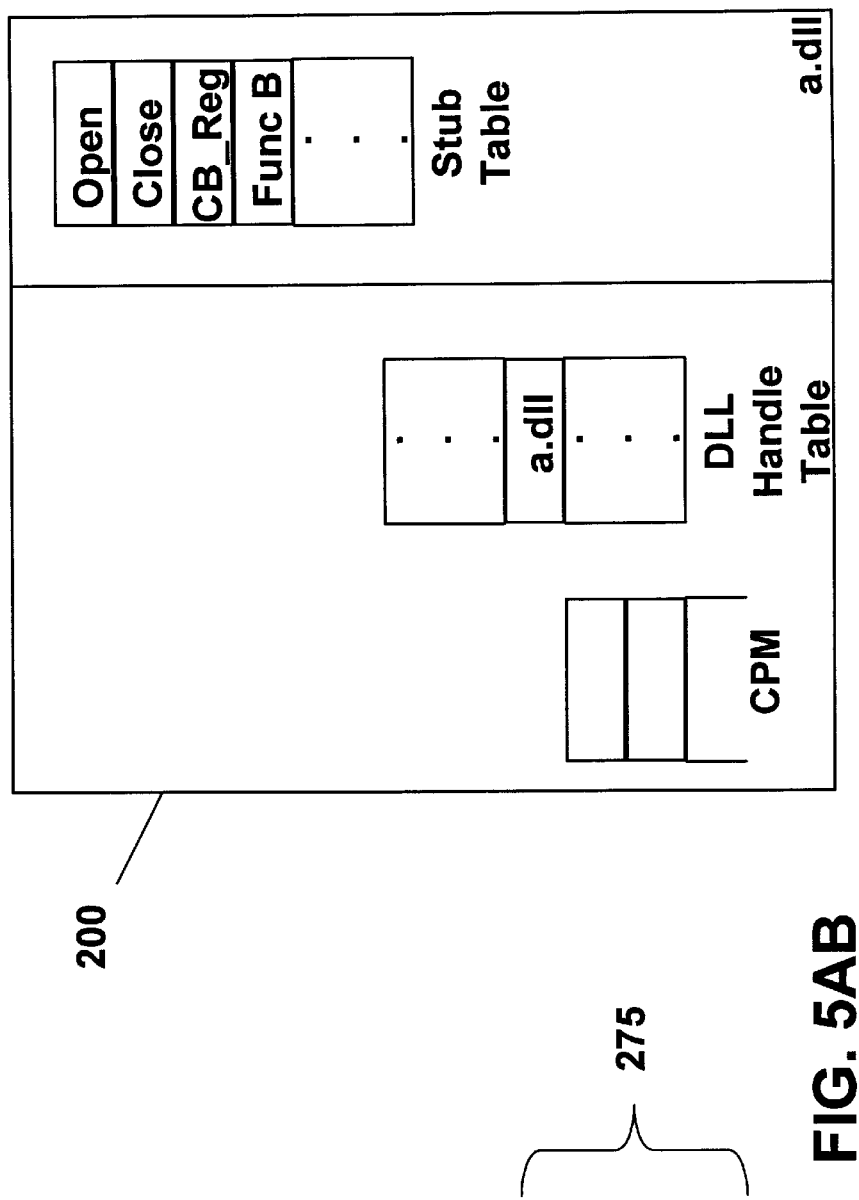

The NT Operating System calls the Call-Back Unregistration Stub Procedure in the DLL (block 170/270, FIG. 5X). Next, the Call-Back Unregistration Stub Procedure calls the Call-Back Unregistration Server Procedure (block 171/271, FIG. 5Y). The Call-Back Unregistration Server Procedure unregisters the Call-Back Procedures and then exits (block 172/272, FIG. 5Y). Next, the Call-Back Unregistration Stub Procedure exits (block 173/273, FIG. 5Z). Within the MCP Operating System the CPU 114 then cuts the Client Program stack back to the Call-Back Unregistration Proxy Procedure activation record (block 174/274, FIG. 5AA). The process description continues with reference to FIG. 4F at a connector H.

Figure 4G:
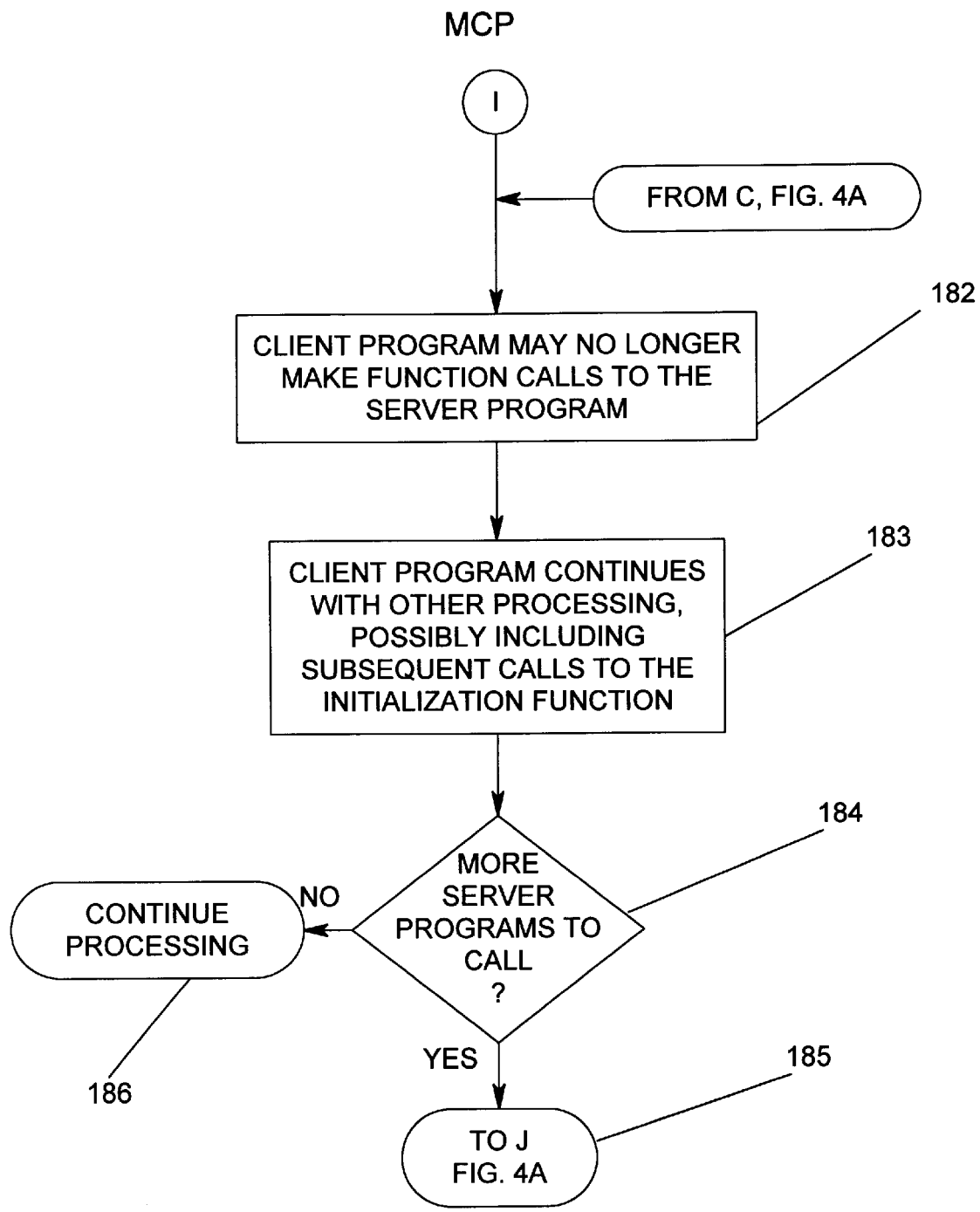

Referring now to FIG. 4F at the connector H, the Call-Back Unregistration Proxy Procedure exits (block 175/275, FIG. 5AB). Next, the Client Program calls the Close_FCW Protocol Procedure passing the DLL number assigned during Open_FCW (block 176). Entry into the Close_FCW Protocol Procedure transfers control to the Windows NT Operating System. The Windows NT attempts to terminate the specified DLL (block 177/277, FIG. 5AC). An inquiry is then made as to whether or not the termination was successful (diamond 178). If the termination was successful, then the CPU 109 leaves a zero (0) on top of the MCP stack (block 179). On the other hand, if the termination was not successful, then a one (1) is left on top of the MCP stack (block 180). Following the step depicted by the block 179 or 180, the CPU 114 under control of the MCP Operating System cuts the Client Program stack back to the activation record below the Close_FCW Procedure (block 181). The process description continues with reference to FIG. 4G at a connector I.

Referring now to FIG. 4G at the connector I, the Client Program may no longer make function calls to the Server Program since the specified DLL was terminated (block 182/282, FIG. 5AC). It is pointed out that the connector C from FIG. 4A also connects with the block 182. The Client Program continues with other processing, possibly including subsequent calls to the initialization function (block 183). This continuation of other processing of programs may occur for quite some time, and may not involve the External Procedure Call program hereof, before an additional call is made for another Server Program. It is noted that such a call to another Server Program could be to the Server Program 106 or to an entirely separate server program that shares the same common memory 118. At such time, an inquiry is next made as to whether or not there are more Server Programs to call (diamond 184). If the answer to this inquiry is yes, then a branch is taken back to the step depicted by the block 131 in FIG. 4A at a connector J (bubble 185) for beginning anew the entire process. On the other hand, if the answer to this inquiry is no, then the Client Program continues with any other normal processing (bubble 186).

At this juncture of the description it is noted that the designations of Client Program in the O/S I, or Server Program in the O/S II is determined by which program makes a call to an initialization Generated Function. The program that makes such a call is designated the Client Program, and the other program is designated the Server Program. The designation is transient, and only applicable during the duration of each step of the above-described process. Either program may be both a Client Program and a Server Program at different times, as determined by the functions declared in the Interface Definition Language. In this way, it is possible for a program in the O/S I to call functions resident in a program in the O/S II, and for the same program in the O/S II to call functions resident in the program in the O/S I. That is, the programs may alternate the roles of Client Program and Server Program.

Further, these role reversals may be interleaved. That is, a program acting as a Server Program may begin acting as a Client Program, while still in the role of a Server Program. This process is known as callbacks in External Procedure Calls, and occurs when a called server function (while processing) calls a function resident in the original program that called the server function. Further, these call-back functions may be nested. That is, a program acting as a Client Program, and then acting as a Server Program during the scope of the Client Program call, may then act again as a Client Program during the scope of the server function execution. In this way, function calls may proceed back and forth between the programs, each building on the other, to an arbitrary depth. When calls are made in this fashion, most recently invoked functions are always completed and exited prior to any earlier invoked functions being completed. That is, functions are completed in a last-invoked first-completed fashion.

Referring now to FIGS. 5A through 5AC (intentionally excluding reference letters O and I so as to avoid confusion), the individual steps of the method of the present invention are illustrated graphically. It should be noted that the diagrams in these figures represent parts of the Programs stored in the memory 118. Moreover, these figures are divided in a similar manner to that used for FIGS. 4A through FIG. 4G. That is, the MCP operating system is on the left-hand side of each sheet and the Windows NT operating system is on the right-hand side of each sheet.

The acronyms used in FIGS. 5A through 5AC refer to standard programming terminology for the E-Mode architecture employed in the Clearpath HMP systems computer systems manufactured and sold by Unisys Corporation, assignee hereof. All but one are control words of the E-Mode architecture. These control words are placed on the program stack. A brief definition of each of the acronyms are as follows:

1. PCW Program Control Word: This control word defines the entry point in the code stream for a procedure (function).
2. FCW Function Control Word: This control word is an implementation-dependent alternative to a PCW for procedure entry.
3. IRW Indirect Reference Word: A control word that contains an address couple pointing to a cell in the stack. It is used to fetch and store data into stack variables. It consists of a base and offset couplet and can only reference cells within the same stack.
4. SIRW Stuffed Indirect Reference Word: A modified IRW (see above) that can reference cells in other stacks. It is "stuffed" with the identifier of the stack to which it points.
5. MKST Mark Stack Control Word: This control word marks the beginning of a stack activation record within the stack and contains the information necessary to return to the previous stack activation record.
6. CPM Central Processing Module (processor)—This is not a control word, but rather a term used to refer to a CPU that implements the ClearPath HMP instruction set.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

What is claimed is:

1. In a heterogeneous computer system having at least two CPUs and a common memory completely accessible by at least one of said CPUs and being disposed for storing at least two operating systems that actively run simultaneously and concurrently control resources of said heterogeneous computer system, a method for performing function calls from a Client Program operating under control of a first of said operating systems to a Server Program operating under control of a second of said operating systems and back again to said Client Program, said method comprising the steps of:

a. said Client Program calling a first procedure for initializing said Server Program via a CPU-to-CPU signal bus between said at least two CPUs;
b. said Client Program calling via said CPU-to-CPU signal bus a second procedure representing a desired first external function to be executed by said Server Program;
c. said Client Program storing parameters in a Client program stack stored within a portion of said common memory;
d. said second procedure fetching said parameters directly from said Client program stack and causing said desired first external function to be executed by said Server Program;
e. said desired first external function then calling a third procedure representing a second desired external function to be executed by said Client Program;
f. said first desired external function storing any necessary parameters in a Server program stack within a portion of said common memory;
g. said third procedure fetching said parameters from said Server program stack;
h. said third procedure causing said desired second external function to be executed by said Client Program;
i. said second external function storing in said Server program stack any results via said third procedure;
j. said Server Program continuing to execute said first external function to completion and storing in said Client program stack any results, via said second procedure;
k. said Client program fetching said results_from said Client program stack; and,
l. said Client and Server Programs repeating steps b through k for each function called by said Client Program.

2. The method as in claim 1 further including said Client Program calling a fourth procedure for terminating use of said Server Program.

3. The method as in claim 1 wherein step a further includes the steps of:

a. determining if initiation of said Server Program was successful, and if so;
b. said Client Program calling a Call-back Stub Registration Procedure for informing said Server Program of the location of external functions available in said Client Program; and,
c. said Call-back Stub Registration Procedure causing a Server Program Call-back Registration Procedure to be executed in said Server Program, passing to said Server Program Call-back Registration Procedure a reference to said Client Program external functions; and,
d. said Server Program Call-back Registration Procedure storing said reference for subsequent use in step g of claim 1.

4. The method as in claim 1 wherein said first procedure is a protocol procedure for effecting communication between the CPUs of said heterogeneous computer system for the purpose of initiating said Server Program.

5. The method as in claim 1 wherein said second procedure is a proxy procedure for invoking said first desired external function in said Server Program.

6. The method as in claim 1 wherein said third procedure is a call-back proxy procedure for invoking said second desired external function in said Client Program.

7. The method as in claim 1 wherein step h thereof further includes converting said results from a format compatible with said Client Program to a format compatible with said Server Program.

8. The method as in claim 1 wherein step c thereof further includes converting said parameters from a format compatible with said Client Program to a format compatible with said Server Program.

9. The method as in claim 1 wherein said step j further includes the step of said Client Program determining if more Server Program functions are to be called, and if yes, returning to b of claim 1.

10. The method as in claim 1 wherein said step i further includes the step of said first external function in said Server Program determining if more Client Program functions are to be called, and if yes, returning to e of claim 1.

11. The method as in claim 1 wherein said step d includes the step of converting said parameters from a format compatible with said Client Program to a format compatible with said Server Program.

12. The method as in claim 1 wherein said step g includes the step of converting said parameters from a format compatible with said Server Program to a format compatible with said Client Program.

13. In a heterogeneous computer system having at least two CPUs and a common memory completely accessible by at least one of said CPUs and being disposed for storing at least two operating systems that actively run simultaneously and concurrently control resources of said heterogeneous computer system, a method for performing function calls from a Client Program operating under control of a first of said operating systems to a Server Program operating under control of a second of said operating systems and back again to said Client Program, said method comprising the steps of:

a. said Client Program calling via a CPU-to-CPU signal bus between said at least two CPUs a first protocol procedure for initializing said Server Program;
   b. said Client Program calling a proxy procedure representing a first external function in said Server Program;
   c. said Client Program storing parameters in a Client program stack stored within a portion of said common memory;
   d. said proxy procedure fetching said parameters from said Client program stack and causing said desired first external function to be executed by said Server Program;
   e. said desired first external function then calling a call-back proxy procedure representing a second desired external function to be executed by said Client Program;
   f. said first desired external function storing any necessary parameters in a Server program stack within a portion of said common memory;
   g. said call-back proxy procedure fetching said parameters from said Server program stack and causing said desired second external function to be executed by said Client Program;
   h. said second external function storing any results in said Server program stack, via said call-back proxy procedure;
   i. said Server Program continuing to execute said first external function to completion and storing any results in said Client program stack;
   j. said Client and Server Programs repeating steps b through i for each function called by said Client Program; and,
   k. said Client Program calling via said CPU-to-CPU signal bus a second protocol procedure for terminating use of said Server Program.

14. The method as in claim 13 further including said first protocol procedure passing to said second operating system an identifying name of a Server function being called.

15. The method as in claim 14 further including said second operating system indicating to said first operating system when initiation of said Server Program is successful.

16. The method as in claim 13 further including the steps of:

a. determining if initiation of said Server Program was successful, and if so;
   b. said Client Program calling a Call-back Stub Registration Procedure for informing said Server Program of the location of external functions available in said Client Program; and,
   c. said Call-back Stub Registration Procedure causing a Server Program Call-back Registration Procedure to be executed in said Server Program, passing to said Server Program Call-back Registration Procedure a reference to said Client Program external functions; and,
   d. said Server Program Call-back Registration Procedure storing said reference for subsequent use in step g of claim 13.

17. The method as in claim 13 wherein step h thereof further includes converting said results from a format compatible with said Client Program to a format compatible with said Server Program.

18. The method as in claim 13 wherein step c thereof further includes converting said parameters from a format compatible with said Client Program to a format compatible with said Server Program.

19. The method as in claim 13 wherein said step j further includes the step of said Client Program determining if more Server Program functions are to be called, and if yes, returning to b of claim 13.

20. The method as in claim 13 wherein said step i further includes the step of said first external function in said Server Program determining if more Client Program functions are to be called, and if yes, returning to e of claim 1.

21. The method as in claim 13 wherein said step d includes the step of converting said parameters from a format compatible with said Client Program to a format compatible with said Server Program.

22. The method as in claim 13 wherein said step g includes the step of converting said parameters from a format compatible with said Server Program to a format compatible with said Client Program.

* * * * *